US007778292B2

(12) United States Patent
Suzuki et al.

(10) Patent No.: US 7,778,292 B2
(45) Date of Patent: Aug. 17, 2010

(54) LASER PROCESSING APPARATUS, METHOD FOR MAKING SETTINGS FOR THE LASER PROCESSING APPARATUS, PROGRAM FOR MAKING SETTINGS FOR THE LASER PROCESSING APPARATUS, AND COMPUTER-READABLE RECORDING MEDIUM

(75) Inventors: Hideyuki Suzuki, Osaka (JP); Takaaki Ito, Osaka (JP)

(73) Assignee: Keyence Corporation, Osaka (JP)

( * ) Notice: Subject to any disclaimer, the term of this patent is extended or adjusted under 35 U.S.C. 154(b) by 92 days.

(21) Appl. No.: 12/270,152

(22) Filed: Nov. 13, 2008

(65) Prior Publication Data

US 2009/0154509 A1 Jun. 18, 2009

(30) Foreign Application Priority Data

Dec. 14, 2007 (JP) ............................. 2007-323685

(51) Int. Cl.
*H01S 3/04* (2006.01)
*H01S 3/10* (2006.01)
*H01S 3/13* (2006.01)
(52) U.S. Cl. ...................... 372/22; 372/21; 372/29.021; 372/34
(58) Field of Classification Search ................... 372/21, 372/22, 29.021, 34
See application file for complete search history.

(56) References Cited

U.S. PATENT DOCUMENTS

| 5,606,647 | A | 2/1997 | Hasebe et al. |
| 5,734,412 | A | 3/1998 | Hasebe et al. |
| 6,061,081 | A | 5/2000 | Hasebe et al. |
| 6,125,130 | A | 9/2000 | Schmitt et al. |
| 2008/0011854 | A1 | 1/2008 | Idaka |
| 2008/0017619 | A1 | 1/2008 | Yamakawa et al. |
| 2008/0023455 | A1 | 1/2008 | Idaka et al. |
| 2008/0067251 | A1 | 3/2008 | Yoshimoto et al. |
| 2008/0225917 | A1 | 9/2008 | Sato |

FOREIGN PATENT DOCUMENTS

| JP | 2000-503480 | 3/2000 |
| JP | 2000-202655 | 7/2000 |

OTHER PUBLICATIONS

U.S. Appl. No. 12/270,081, filed Nov. 13, 2008.

*Primary Examiner*—Armando Rodriguez
(74) *Attorney, Agent, or Firm*—Kilyk & Bowersox, P.L.L.C.

(57) ABSTRACT

It is an object to enable control according to an optimum temperature condition for a wavelength conversion device. There are provided a laser medium for creating fundamental-wave laser light with a fundamental frequency; a wavelength conversion device which, if the fundamental-wave laser light from the laser medium is inputted thereto, creates higher-harmonic-wave laser light with a harmonic wavelength of a higher order than the wavelength of the fundamental-wave laser light; a temperature measurement section for measuring the temperature of the wavelength conversion device; a temperature adjustment section for adjusting the temperature of the wavelength conversion device; a temperature control section for controlling the temperature adjustment section for changing the temperature of the wavelength conversion device within a predetermined range; an output monitoring section for measuring the laser power emitted from the wavelength conversion device at each temperature of the wavelength conversion device which is changed in temperature by the temperature control section; and a temperature setting section for setting the temperature of the wavelength conversion device at which the laser power measured by the output monitoring section has a maximum value, as an optimum temperature of the wavelength conversion device.

14 Claims, 13 Drawing Sheets

F I G. 1 2
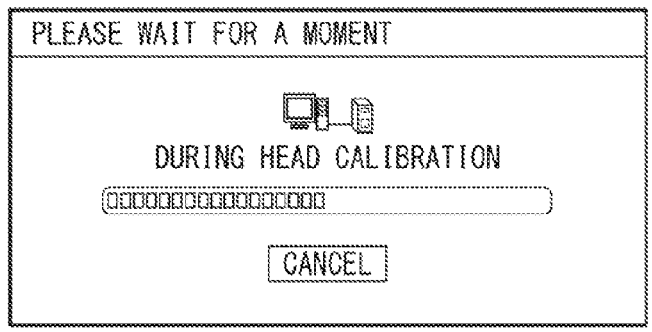
F I G. 1 3
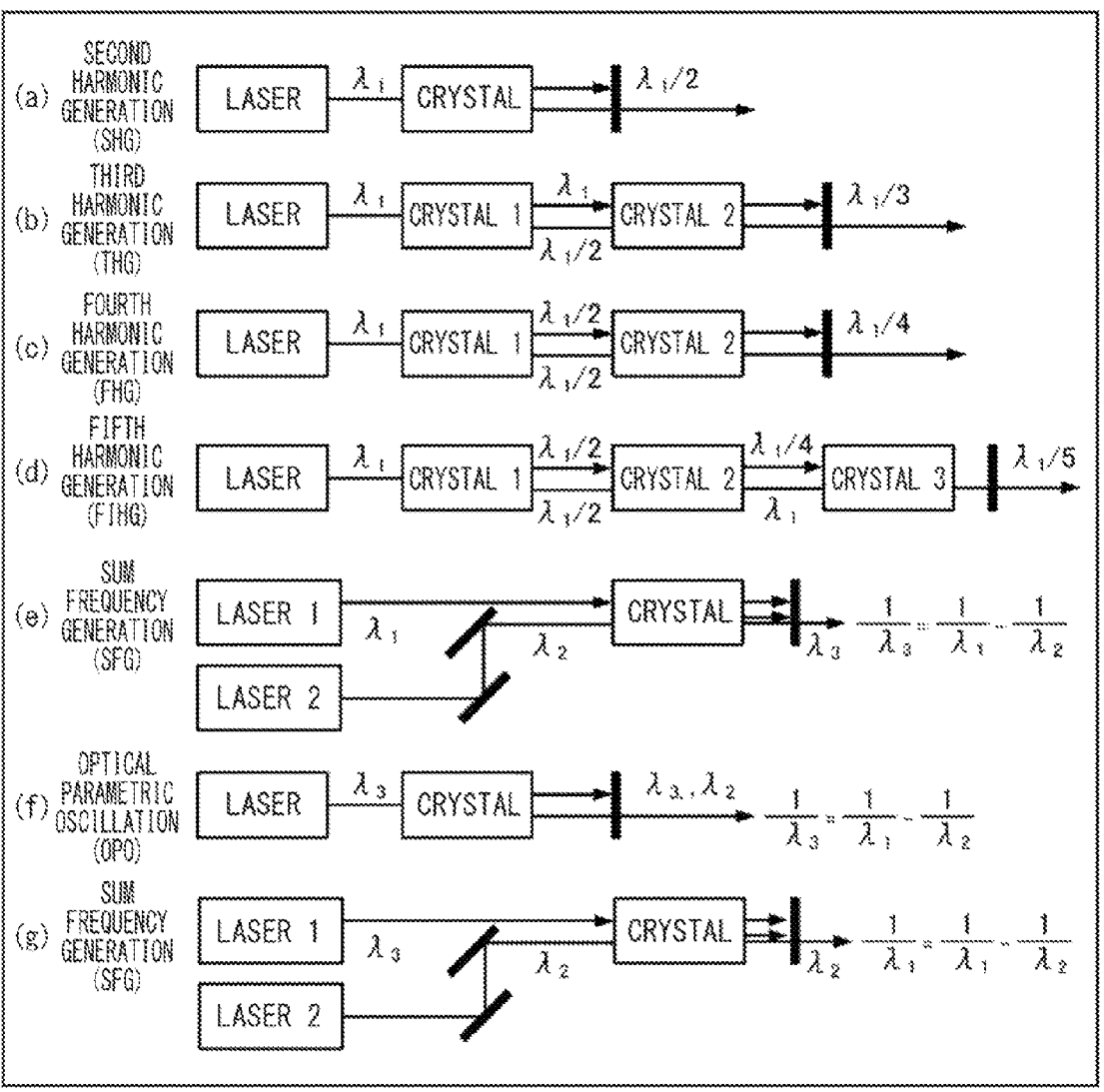

ature control section for controlling the temperature of the wavelength conversion device to cause the temperature of the wavelength conversion device to coincide with a predetermined target temperature; and a laser control portion for controlling the laser medium to output the laser light; wherein the laser control portion includes: a temperature control portion which drives the temperature control section to perform temperature control such that the temperature of the wavelength conversion device coincides with the target temperature; an optimum-temperature detection portion which, while the temperature control portion changes the target temperature over a predetermined range, measures the intensity of the higher-harmonic-wave laser light outputted from the wavelength conversion device, for detecting the target temperature which provides the highest intensity of the higher-harmonic-wave laser light; and an update portion which updates the target temperature of the temperature control portion to the target temperature detected by the optimum-temperature detection portion. With this structure, the optimum temperature of the wavelength conversion device is measured from the intensity of the higher-harmonic-wave laser light, which makes it easier to reflect its actual temperature in comparison with detection of the temperature of the wavelength conversion device itself. Thus, it is possible to perform accurate temperature control for the wavelength conversion device, thereby providing stable processing performance.

A laser processing apparatus according to a second aspect of the present invention is the laser processing apparatus, wherein the optimum-temperature detection portion, for detecting the target temperature which provides the highest intensity of the higher-harmonic-wave laser light, extracts at least three measurement points from values of the intensity of the higher-harmonic-wave laser light which have been measured while the target temperature of the temperature control portion is changed and, also, determines the peak of the intensity of the higher-harmonic-wave laser light from an approximate curve specified by the at least three measurement points, thereby determining the target temperature which provides the peak. With this structure, in specifying the peak value from the plurality of the measurement points, an approximate curve is used to determine the peak therefrom, which enables detecting the peak without being influenced by fluctuations in laser light and the like, thereby enabling accurate detection of the optimum temperature.

A laser processing apparatus according to a third aspect of the present invention is the laser processing apparatus, wherein the optimum-temperature detection portion performs a primary approximation using values of the intensity of the higher-harmonic-wave laser light in two regions before and after the peak of the intensity of the higher-harmonic-wave laser light which have been measured while the target temperature of the temperature control portion is changed and, also, determines the temperature value at the intersection point between the primary-approximation straight lines in the two regions, as the target temperature which provides the peak of the intensity of the higher-harmonic-wave laser light.

A laser processing apparatus according to a fourth aspect of the present invention is the laser processing apparatus, wherein the optimum-temperature detection portion, for detecting the target temperature which provides the highest intensity of the higher-harmonic-wave laser light, changes the target temperature with a first step value, in a first range, and also changes the target temperature with a second step value smaller than the first step value, in a second range which is narrower than the first range including the maximum value of the intensity of the higher-harmonic-wave laser light in the first range.

A laser processing apparatus according to a fifth aspect of the present invention is the laser processing apparatus, wherein the laser control portion further includes a determination portion which determines whether or not the intensity of the higher-harmonic-wave laser light has been decreased to be equal to or less than a predetermined rate with respect to the intensity of the higher-harmonic-wave laser light at the target temperature, and, if the determination portion determines that the intensity of the higher-harmonic-wave laser light has been decreased to be equal to or less than the predetermined rate, the optimum-temperature detection portion detects the target temperature which provides the highest intensity of the higher-harmonic-wave laser light. With this structure, the optimum temperature is automatically adjusted only when the laser intensity is decreased, which enables avoiding useless adjustments during stable states, thereby enabling efficient temperature control.

A laser processing apparatus according to a sixth aspect of the present invention is the laser processing apparatus, wherein the laser control portion further includes a light receiving section for receiving the higher-harmonic-wave laser light; and the determination portion determines whether or not the intensity of the higher-harmonic-wave laser light has been decreased to be equal to or less than the predetermined rate with respect to the intensity of the higher-harmonic-wave laser light at the target temperature, based on the intensity of the higher-harmonic-wave laser light received by the light receiving section.

A laser processing apparatus according to a seventh aspect of the present invention is the laser processing apparatus, further including a communication section for connection to a computer for inputting data for laser processing to the laser control portion, wherein the computer is provided with a setting portion for setting the target temperature of the temperature control portion in the laser control portion through the communication section.

A method for making settings for a laser processing apparatus according to an eighth aspect of the present invention is a method for making settings for a laser processing apparatus, the laser processing apparatus including a laser medium for creating fundamental-wave laser light with a fundamental frequency, a wavelength conversion device which, if the fundamental-wave laser light from the laser medium is inputted thereto, creates higher-harmonic-wave laser light with a harmonic wavelength of a higher order than the wavelength of the fundamental-wave laser light, a temperature measurement section for measuring the temperature of the wavelength conversion device, a temperature adjustment section for adjusting the temperature of the wavelength conversion device; a temperature control section for controlling the temperature adjustment section for changing the temperature of the wavelength conversion device within a predetermined range; an output monitoring section for measuring the laser power emitted from the wavelength conversion device at each temperature of the wavelength conversion device which is changed in temperature by the temperature control section; and a temperature setting section for setting the temperature of the wavelength conversion device at which the laser power measured by the output monitoring section has a maximum value, as an optimum temperature of the wavelength conversion device.

This enables executing temperature searching for acquiring an optimum temperature which causes the wavelength conversion device to exhibit maximum laser power. By controlling the temperature of the wavelength conversion device to the optimum temperature, it is possible to obtain a high laser output.

A laser processing apparatus according to a second aspect of the present invention further includes an initial-set-temperature storage section for storing an initially-set ambient temperature around the wavelength conversion device, an ambient-temperature acquisition section for acquiring the ambient temperature around the wavelength conversion device, and a searching-range setting section for setting a start temperature with which the temperature adjustment section starts changing the temperature of the wavelength conversion device for performing temperature searching, based on the initially-set ambient temperature stored in the initial-set-temperature storage section, and also for setting whether the temperature searching should be executed toward a higher temperature or a lower temperature than the start temperature, based on the ambient temperature acquired by the ambient-temperature acquisition section.

This enables setting a temperature searching range suitable for the wavelength conversion device with the searching-range setting section. Particularly, the direction of the temperature searching and the start temperature can be properly set, based on the initial set temperature and the current ambient temperature. This enables temperature searching capable of finding an optimum temperature efficiently.

In a laser processing apparatus according to a third aspect of the present invention, the searching-range setting section executes temperature searching from the start temperature toward a higher temperature if the ambient temperature acquired by the ambient-temperature acquisition section is lower than a predetermined temperature and executes temperature searching from the start temperature toward a lower temperature if the ambient temperature acquired by the ambient-temperature acquisition section is higher than the predetermined temperature.

This enables narrowing down the temperature searching range, thereby enabling determining an optimum temperature more rapidly.

In a laser processing apparatus according to a fourth aspect of the present invention, the start temperature for the temperature searching is set to the initially-set ambient temperature stored in the initial-set-temperature storage section plus a pre-set amount of offset.

This enables certainly detecting an optimum temperature without missing the optimum temperature, even when the optimum temperature exists near the initially-set ambient temperature.

A laser processing apparatus according to a fifth aspect of the present invention further includes a temperature searching determination section which determines that temperature searching should be executed, if the temperature difference between the initially-set ambient temperature stored in the initial-set-temperature storage section and the ambient temperature acquired by the ambient-temperature acquisition section exceeds a preset reference value.

This enables determining whether or not temperature searching is necessary. This enables automatically executing temperature searching as required or taking proper measures such as urging the user to take measures regarding the temperature.

Further, in a laser processing apparatus according to a sixth aspect of the present invention, the temperature measurement section is also used as the ambient-temperature acquisition section.

This enables treating the temperature of the wavelength conversion device which is measured by the temperature measurement section as the ambient temperature. This can eliminate members required for temperature measurement, thereby simplifying the apparatus.

In a laser processing apparatus according to a seventh aspect of the present invention, the temperature adjustment section changes the temperature with a predetermined sampling interval and, if the amount of change of the temperature has fallen within a predetermined range after the elapse of a predetermined time, a temperature holding section determines that the temperature has been stabilized and holds an optimum temperature and the laser power at this time.

This enables holding the stabilized temperature and laser power.

In a laser processing apparatus according to an eighth aspect of the present invention, if substantially the same laser power has been continuously obtained a predetermined number of times, as the output from the output monitoring section, the average of the continuously-obtained temperatures is held as an optimum temperature.

This enables acquiring an optimum temperature value with higher reliability.

A laser processing apparatus according to a ninth aspect of the present invention further includes a second wavelength conversion device which is placed on the optical axis of the light emitted from the wavelength conversion device and is capable of conversion of the wavelength of this emitted light, and a second temperature control section capable of controlling the temperature of the second wavelength conversion device independently of the wavelength conversion device.

Accordingly, even when third or higher-order harmonic waves are created using a plurality of wavelength conversion devices, it is possible to make temperature settings for the individual respective wavelength conversion devices. This enables controlling the temperatures of the wavelength conversion devices to respective optimum temperatures therefor, which enables making full use of their inherent performance.

In a laser processing apparatus according to a tenth aspect of the present invention, a setting of an optimum temperature is made at the time of activation of the laser processing apparatus.

Accordingly, at every power up, a setting of an optimum temperature can be made, which enables performing laser processing with the wavelength conversion device which is continuously controlled in temperature, during operations of the laser processing apparatus.

In a laser processing apparatus according to an eleventh aspect of the present invention, a setting of an optimum temperature is made at the time of execution of calibration of the laser processing apparatus.

Accordingly, the setting of an optimum temperature for the wavelength conversion device and laser power calibration can be started by a common trigger, which enables the user to perform these processing concurrently.

A method for making settings for a laser processing apparatus according to a twelfth aspect of the present invention is a method for making settings for a laser processing apparatus, the laser processing apparatus being adapted to input fundamental-wave laser light to a wavelength conversion device for directing, to a to-be-processed surface, higher-harmonic-wave laser light with a harmonic wavelength of a higher order than the wavelength of the fundamental-wave laser light for performing desired processing thereon, the method including the steps of: controlling a temperature adjustment section for adjusting the temperature of the wavelength conversion device for changing the temperature of the wavelength conversion device within a predetermined range and executing temperature searching for measuring the power of the laser light emitted from the wavelength conversion device at each temperature; and setting the maximum laser power value and the temperature of the wavelength conversion device at the time when the laser power had a maximum value as a result of the temperature searching, as an optimum temperature of the wavelength conversion device.

This enables executing temperature searching for acquiring an optimum temperature which causes the wavelength conversion device to exhibit maximum laser power. By controlling the temperature of the wavelength conversion device to the optimum temperature, it is possible to obtain a high laser output.

A program for making settings for a laser processing apparatus according to a thirteenth aspect of the present invention is a program for making settings for a laser processing apparatus, the laser processing apparatus being adapted to input fundamental-wave laser light to a wavelength conversion device for directing, to a to-be-processed surface, higher-harmonic-wave laser light with a harmonic wavelength of a higher order than the wavelength of the fundamental-wave laser light for performing desired processing thereon, the program causing a computer to realize the functions of: controlling a temperature adjustment section for adjusting the temperature of the wavelength conversion device for changing the temperature of the wavelength conversion device within a predetermined range and executing temperature searching for measuring the power of the laser light emitted from the wavelength conversion device at each temperature, and setting the maximum laser power value and the temperature of the wavelength conversion device at the time when the laser power had a maximum value as a result of the temperature searching, as an optimum temperature of the wavelength conversion device.

This enables executing temperature searching for acquiring an optimum temperature which causes the wavelength conversion device to exhibit maximum laser power. By controlling the temperature of the wavelength conversion device to the optimum temperature, it is possible to obtain a high laser output.

Further, a computer-readable recording medium according to a fourteenth aspect of the present invention stores the above-described program.

The recording medium includes a magnetic disk, an optical disk, a magneto-optic disk, a semiconductor memory and other mediums capable of storing programs, such as a CD-ROM, a CD-R, a CD-RW, a flexible disk, a magnetic tape, an MO, a DVD-ROM, a DVD-RAM, a DVD-R, a DVD+R, a DVD-RW, a DVD+RW, a Blu-ray, an HD, a DVD (AOD). Further, the program also includes a program stored in the recording medium to be distributed, a program in the form of a program distributed through downloading using a network line such as the Internet, and the like. Further, the recording medium includes an apparatus capable of recording programs, such as a general-purpose apparatus or a dedicated apparatus which incorporates the program at a state where it can be executed in the form of software, firmware and the like. Furthermore, the respective processes and functions included in the program can be executed by program software which can be executed by a computer. Also, the processes at the respective portions can be realized by hardware such as a predetermined gate array (FPGA or ASIC) or by a combination of program software and a partial hardware module which realizes components of partial hardware.

BRIEF DESCRIPTION OF THE DRAWINGS

FIG. 12 is an image view illustrating a state where head calibration is being executed;

FIG. 13 is a block diagram illustrating exemplary placements for generating different higher harmonic waves utilizing a plurality of wavelength conversion devices;

DETAILED DESCRIPTION OF THE PREFERRED EMBODIMENTS

Figure 1:
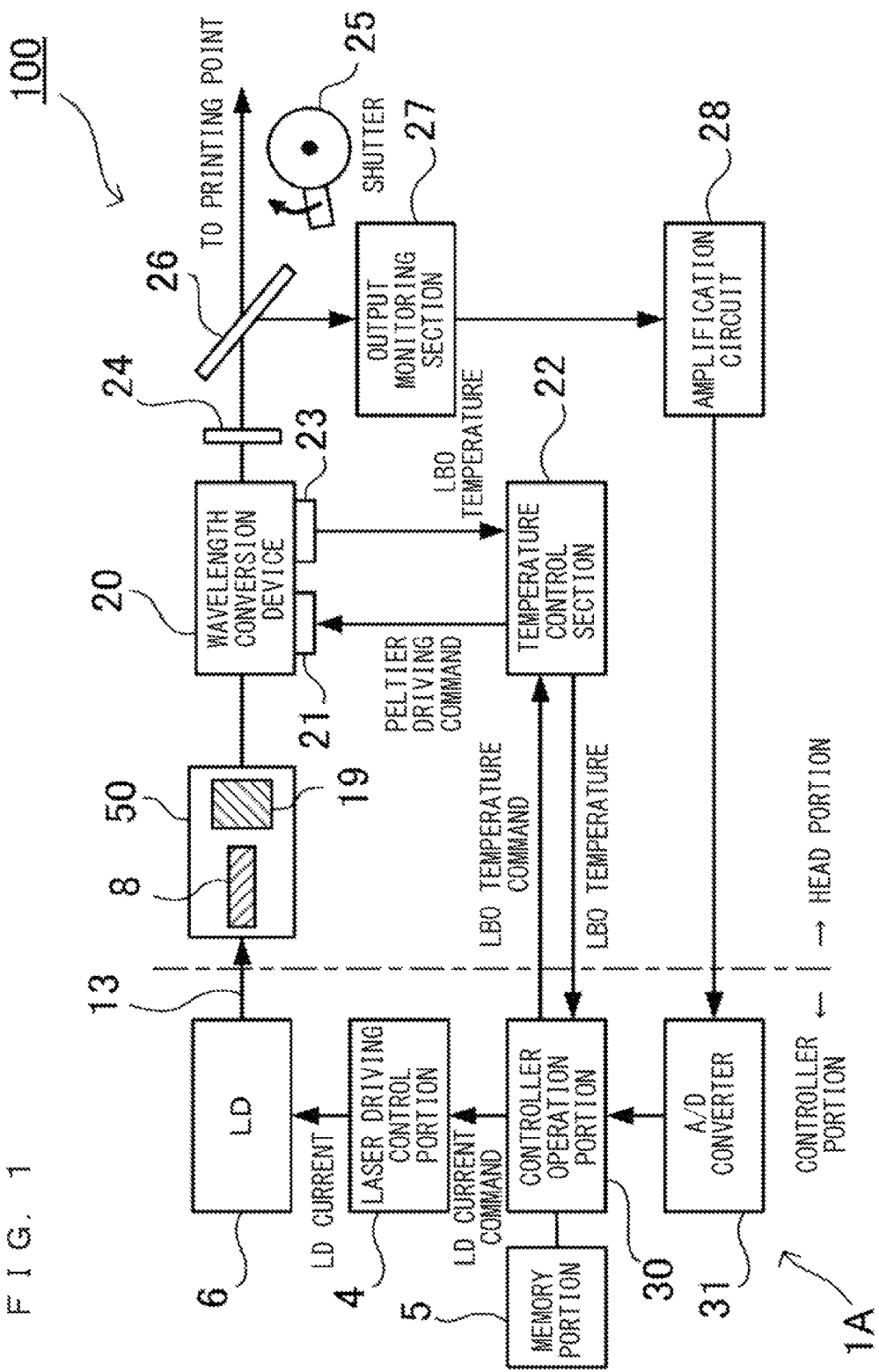
FIG. 1 is a block diagram illustrating a laser processing apparatus according to an embodiment of the present invention.

Hereinafter, an embodiment of the present invention will be described, with reference to the drawings. However, in the embodiment which will be described later, there will be exemplified a laser processing apparatus, a method for making settings for the laser processing apparatus, a program for making settings for the laser processing apparatus and a computer-readable recording medium for concretizing the technical concepts of the present invention and, in the present invention, the laser processing apparatus, the method for making settings for the laser processing apparatus, the program for making settings for the laser processing apparatus and the computer-readable recording medium are not limited to those which will be described later Further, in the present specification, the members defined in the claims are never limited to the members in the embodiment. Particularly, the dimensions, the materials, the shapes and the relative placements of components which will be described in the embodiment are merely illustrative and are not intended to limit the scope of the present invention, unless otherwise specified. Further, the sizes of the members and the positional relationship thereamong which are illustrated in the drawings may be sometimes exaggerated for clarification of the description. Further, in the following description, the same designations and the same reference characters will designate identical or equivalent members, and detailed description thereof will be properly eliminated. Further, as respective components constituting the present invention, a plurality of components can be constituted by a single member such that the single member serves as the plurality of components or, on the contrary, the function of a single member is realized by the plurality of members. Further, contents which will be described in some examples or embodiments can be sometimes utilized in other examples or embodiments or the like.

In the present specification, the laser processing apparatus, a computer connected thereto for operations, control, inputting/outputting, display and other processing, a printer, an external storage device and other peripheral apparatuses are electrically connected to one another for communication thereamong, through, for example, IEEE1394, RS-232x, RS-422, RS-423, RS-485, USB, PS2 which are connected in serial or in parallel or through networks such as 10 BASE-T, 100 BASE-TX, 1000-BASE-T and the like. The connections thereamong are not limited to physical wired connections, but can be wireless connections and the like utilizing wireless LANs of IEEE802.1x type, OFDM type and the like, radio waves such as Bluetooth (registered trademark), infrared waves, optical communications and the like. Further, as recording mediums for storing processing pattern data and for storing setting and the like, it is possible to use memory cards, magnetic disks, optical disks, optical magnetic disks, semiconductor memories and the like.

In the following embodiment, a laser marker will be described, as an example of the laser processing apparatus which concretizes the present invention. However, the laser processing apparatus described in the present specification can be generally used in laser-applied apparatuses, regardless of its designation. For example, the laser processing apparatus can be suitably used in or for laser oscillators, various types of laser processing apparatuses and laser processing such as drilling, marking, trimming, scribing and surface processing. Also, the laser processing apparatus can be used as laser light sources in other laser application fields, such as light sources for high-density recording/replaying for optical disks such as DVDs and Blu-ray (registered trademark) or light sources for communications. Also the laser processing apparatus can be suitably used in or as printing apparatuses, illumination light sources, light sources for display devices such as displays, and medical apparatuses and the like.

Further, in the present specification, printing will be described as a representative example of processing, but the present invention can be used for various types of processing using laser light, such as melting, exfoliation, surface oxidation, cutting, color changing, as well as printing processing, as described above.

(Higher Harmonic Wave Output Laser Processing Apparatus)

FIG. 1 illustrates a block diagram of a laser-light output portion of a laser processing apparatus 100. The laser processing apparatus 100 illustrated in the figure is constituted by a controller portion 1A and a head portion, wherein the controller portion 1A corresponds to a laser control portion 1, and the head portion corresponds to a laser output portion 2.

The controller portion 1A includes an LD device which is a laser excitation portion 6, a laser driving control portion 4 which controls the driving current to be supplied to the LD device, a controller operation portion 30 which instructs the laser driving control portion 4 on the value of the LD driving current, and an A/D converter 31 which performs A/D conversion on a signal relating to the laser power to be supplied from an amplification circuit 28 in the head portion to the controller operation portion 30. The controller portion 1A and the head portion are connected to each other through a cable portion, and the cable portion includes an optical fiber cable 13 for transmitting excitation light outputted from the LD device to the head portion, a signal line for transmitting and receiving electric signals, an electric-power line (not illustrated) for supplying electric power to the head portion, and the like.

Further, the head portion includes a laser medium 8 for causing laser oscillation with the excitation light transmitted through the optical fiber, a Q switch 19 for performing ON/OFF control at a predetermined frequency on the laser oscillating light emitted from the laser medium 8, a wavelength conversion device 20 for changing over the wavelength of the oscillating light emitted from the Q switch 19, a filtering section 24 for cutting off certain wavelength components from the oscillating light resulted from the wavelength conversion as required, a shutter section 25 for shutting off the emission of the oscillating light which has been subjected to the filtering by the filtering section 24 as laser light output from the head portion, an output extraction section 26 for extracting a portion of the laser light output, an output monitoring section 27 which measures the laser power extracted by the output extraction section 26, an amplification circuit 28 which amplifies a signal relating to the laser power detected by the output monitoring section 27 as required, a temperature adjustment section 21 which measures the temperature of the wavelength conversion device 20 and adjusts it, and a temperature control section 22 which controls the temperature adjustment operation by the temperature adjustment section 21. The temperature control section 22, which is connected to the controller operation portion 30 in the controller portion 1A, performs feed back control in such a way as to send the temperature detected by the temperature adjustment section 21 to the controller operation portion 30 and control the temperature adjustment section 21 for controlling the temperature of the wavelength conversion device 20 to a predetermined temperature. On the other hand, the amplification circuit 28 is connected to the A/D converter 31 in the controller portion 1A through the signal line and transmits the signal relating to the laser power to the controller operation portion 30.

(Laser Excitation Portion 6)

Figure 2:
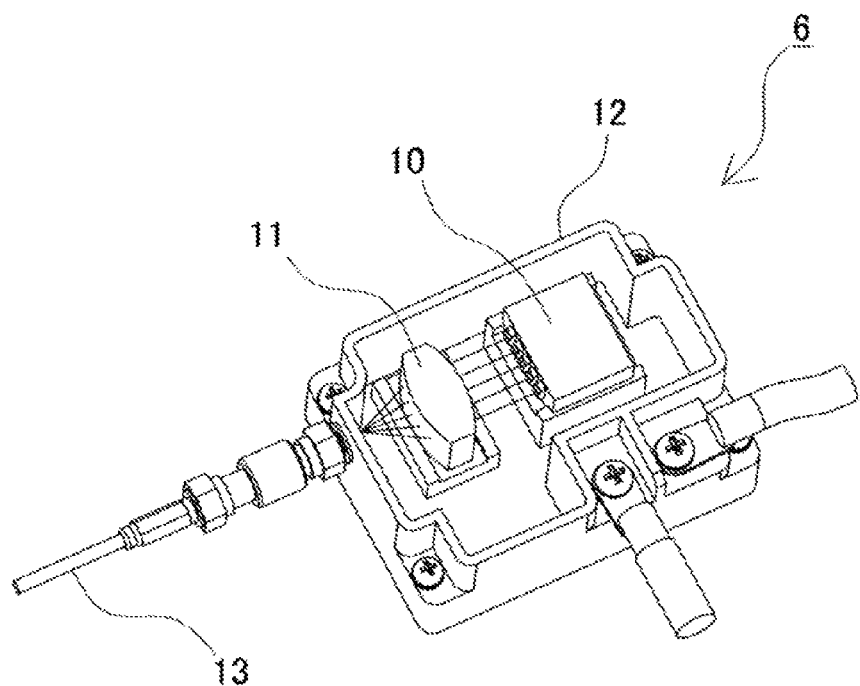
FIG. 2 is a perspective view illustrating the internal structure of a laser excitation portion in FIG. 1.

The laser excitation portion 6 includes a laser excitation light source 10 and a laser excitation light-source condenser portion 11 which are optically coupled to each other. FIG. 2 is a perspective view illustrating an example of the internal portion of the laser excitation portion 6. In the laser excitation portion 6 illustrated in the figure, the laser excitation light source 10 and the laser excitation light-source condenser portion 11 are secured to the inside of a laser-excitationportion casing 12. The laser-excitation-portion casing 12 is made of a metal with excellent heat conductivity such as cupper and, thus, releases heat from the laser excitation light source 10 to the outside with higher efficiently. The laser excitation light source 10 is constituted by semiconductor lasers (Laser Diodes: LDs), excitation lamps or the like. In the example of FIG. 2, there is employed a laser diode array constituted by a plurality of semiconductor laser diode devices which are linearly arranged, such that laser oscillation from the respective devices are outputted in a line shape. The laser oscillation is inputted to an incidence surface of the laser excitation light-source condenser portion 11 and, then, is outputted from an emission surface, as laser excitation light which has been condensed. The laser excitation light-source condenser portion 11 is constituted by a focusing lens or the like. The laser excitation light from the laser excitation light-source condenser portion 11 is inputted to the laser medium 8 in the laser output portion 2 through an optical fiber cable 13 and the like. The laser excitation light source 10, the laser excitation light-source condenser portion 11 and the optical fiber cable 13 are optically coupled to one another through a space or an optical fiber.

(Laser Output Portion 2)

The laser output portion 2 includes a laser oscillation portion 50. The laser oscillation portion 50 which generates laser light LB includes the laser medium 8, an output mirror and a total reflection mirror which are placed oppositely to each other with a predetermined distance interposed therebetween along the optical path of the light emitted through stimulated emission from the laser medium 8, an aperture placed therebetween, the Q switch 19 and the like. The Q switch 19 is placed such that it is faced to one of the end surfaces of the laser medium 8, such that it is positioned on the optical axis of the laser emitted from the laser medium 8. The use of the Q switch 19 enables changing continuous oscillation to high-speed repetition pulsed oscillation with a high peak output value (a peak value). Further, a Q-switch control circuit for creating RF signals to be applied to the Q switch 19 is connected to the Q switch 19. The laser oscillation portion 50 amplifies the light emitted through stimulated emission from the laser medium 8 by multiple reflection between the output mirror and the total reflection mirror, further performs mode selection thereon with the aperture while passing or shutting off the light with a short period through the operation of the Q switch 19 and, further, outputs laser light LB through the output mirror. The laser medium 8 is excited by the laser exciting light inputted thereto from the laser excitation portion 6 through the optical fiber cable 13 to cause laser oscillation. A so-called end pumping system is employed with the laser medium 8, wherein the laser medium 8 is excited by the laser exciting light inputted to one of the end surfaces of its rod shape and emits laser light LB from the other end surface thereof.

In the above-described example, an Nd:YVO$_4$ crystal with a rod shape is employed as the laser medium 8. Further, the wavelength of the semiconductor laser for exciting the solid laser medium is set to 808 nm, which is equal to the center wavelength of the absorption spectrum of the Nd:YVO$_4$. The wavelength of the laser light created by the YVO$_4$ crystal is 1064 nm. However, the present invention is not limited to this example, and it is also possible to employ, as other solid laser mediums, YAG, LiSrF, LiCaF, YLF, NAB, KNP, LNP, NYAB, NPP, GGG and the like which have been doped with rare earth materials, for example.

(Wavelength Conversion Device 20)

Further, the wavelength conversion device 20 is employed in combination with the solid laser medium for changing the wavelength of the outputted laser light to an arbitrary wavelength. As the conversion device, it is possible to employ nonlinear optical crystals, such as KTP (KTiPO$_4$), organic nonlinear optical materials, other inorganic nonlinear optical materials such as KN (KNbO$_3$), KAP (KAsPO$_4$), BBO (β-BaB$_2$O$_4$), LBO (LiB$_3$O$_5$), or bulk-type polarization inversion devices (LiNbO$_3$ (Periodically Polled Lithium Niobate: PPLN), LiTaO$_3$ and the like). Also, it is possible to employ an excitation light-source semiconductor laser for an up-conversion laser employing a fluoride fiber which has been doped with rare earth materials such as Ho, Er, Tm, Sm and Nd. In the example, an LBO is employed as the wavelength conversion device 20. This creates a second harmonic wave with a wavelength of 532 nm.

Further, the plurality of wavelength conversion devices 20 can be employed, instead of employing a single wavelength conversion device. This enables utilizing, as well as second harmonic generation (SHG), third harmonic generation (THG), fourth harmonic generation (FUG), fifth harmonic generation (FIHG), sum frequency generation (SFG), optical parametric oscillation (OPO), differential frequency generation (DFG) and the like.

Further, the present invention can be also applied to a so-called fiber laser which employs a fiber as an oscillator instead of a bulk, as a solid laser medium. Also, it is possible to employ a wavelength conversion device only for wavelength conversion, without using a solid laser medium, in other words, without constituting a resonator for causing oscillation of laser light. In this case, the wavelength conversion is performed on the output light of the semiconductor laser with the wavelength conversion device. As described above, various types of laser sources can be employed as required, in the present embodiment.

As a structure for exciting the solid laser medium, it is possible to employ a single-directional excitation system based on so-called end pumping which inputs exciting light for exciting the solid laser medium from its one end surface for causing excitation thereof and outputs laser light from the other end surface thereof. Also, it is possible to employ a two-directional excitation system for applying exciting light to the front and rear end surfaces of the solid laser medium. In the case of bi-directional excitation, it is possible to employ a structure for placing LDs as excitation light sources on the respective end surfaces and, also, a structure for branching exciting light from a single LD through optical fibers and for causing pumping from the opposite end surfaces of the solid laser medium, and the like.

Particularly, in a laser processing apparatus adapted to excite a solid laser medium, 30 to 40% of the excitation power becomes heat and thus is lost, due to the limit of the quantum efficiency. Therefore, in order to make full use of the extreme performance, there is a need for overcoming various thermal problems, such as thermal birefringence, thermal lenses, thermal doublet lenses and even thermally-induced fractures which become obvious due to strong excitation. Particularly, in the case of an LD-excitation solid laser processing apparatus, the absorption of the exciting light by the solid laser medium induces heat generation, which induces lens effects in the crystal itself, thereby inducing thermal lenses. Such thermal lenses significantly degrade the stability of the laser resonator, thereby largely obstructing the design of the resonator. The use of a bi-directional excitation system can alleviate these problems. Further, such a bi-directional excitation system can be structured such that a single excitation light source is employed as a laser excitation potion 6 and is branched to be introduced to the respective end surfaces, which can suppress the occurrence of thermal lenses and the like. In addition, it is possible to offer the advantage of improvement of the stability with respect to the excitation wavelength and improvement of the rising characteristic.

(temperature measurement section 23; the temperature adjustment section 21; the temperature control section 22)

The temperature measurement section 23 and the temperature adjustment section 21 are secured to the wavelength conversion device 20. Further, the temperature measurement section 23 and the temperature adjustment section 21 are connected to the temperature control section 22 and are controlled by the temperature control section 22. Further, the temperature control section 22 is controlled by the controller operation portion 30. The temperature control section 22 which is controlled by the controller operation portion 30 controls the temperature adjustment section 21 such that the temperature of the wavelength conversion device 20 becomes a predetermined temperature, according to the temperature detected by the temperature measurement section 23. The temperature measurement section 23 is constituted by a component capable of measuring the temperature of the wavelength conversion device 20, such as a thermocouple. Further, the temperature adjustment section 21 is a component for heating or cooling the wavelength conversion device 20 for adjusting the temperature thereof and can be preferably constituted by a Peltier device. Further, it is preferable that the temperature measurement section 23 and the temperature adjustment section 21 are directly contacted with the wavelength conversion device 20, but they can be connected to the wavelength conversion device 20 at a heat conductive state with some members interposed therebetween.

Further, in addition to the temperature measurement section, it is possible to provide an ambient-temperature acquisition section for measuring the ambient temperature. However, the temperature of the wavelength conversion device 20 which is measured by the temperature measurement section 23 can be used as the ambient temperature. In this case, the temperature measurement section 23 can be caused to serve as the ambient-temperature acquisition section, which can reduce the number of required components, thereby further simplifying the control.

(Filtering Section 24)

The filtering section 24 and the output extraction section 26 are placed on the optical axis of the laser light output. The filtering section 24 transmits, therethrough, only a wavelength range required for processing, out of the laser light output emitted from the wavelength conversion device 20, while cutting off the other wavelength components. For example, in the case where an Nd:YVO$_4$ crystal is employed as the solid laser medium and an LBO is employed as the wavelength conversion device 20, the laser light output is constituted by light with a wavelength of 1064 nm, which is a fundamental wave emitted from the Nd:YVO$_4$, and light with a wavelength of 532 nm, which is a second harmonic wave resulted from the wavelength conversion by the LBO. Out of them, only a wavelength of 532 nm is extracted, while a component with a wavelength of 1064 nm is cut off by the filtering section 24.

(Output Extraction Section 26)

The output extraction section 26 transmits, therethrough, the most of the laser light output resulted from the filtering by the filtering section 24, while reflecting a portion of the laser light output toward the output monitoring section 27. This enables extracting a portion of the laser light output and determining the laser power from the value thereof. As described above, the output extraction section 26 functions as a beam sampler and can be constituted by a partial reflection mirror which reflects 1 to several percent of the laser light output.

(Shutter Section 25)

The shutter section 25 is a component for switching between shut-off and transmission of the laser light output. The shutter section 25 is provided on the optical path of the laser light and is capable of switching between the close state where the laser light is shut off and the open state where the laser light is transmitted therethrough. When temperature searching which will be described later is performed, the shutter section 25 is brought into the close state, in order to eliminate the influence of returned light.

(Output Monitoring Section 27)

The output monitoring section 27 receives the laser light output which has been deflected by the output extraction section 26 and detects the output value thereof Preferably, the output monitoring section 27 is a power meter for converting the energy of the laser power into an amount of electricity, and can be constituted by a thermopile or a pyroelectric device. In this case, a thermopile is employed. The thermopile includes an infrared-ray receiving portion (a hot junction) constituted by a plurality of thermocouples connected in series to one another. If an infrared ray is inputted to the infrared-ray receiving portion of the thermopile, this will induce a temperature difference between the hot junction and the cold junction according to the amount of the inputted infrared ray, thereby inducing a thermoelectromotive force corresponding to the difference. The thermoelectromotive force corresponds to the temperature of a to-be-measured target, namely the infrared-ray energy. Thus, the electric signal obtained from the thermopile is amplified by the amplification circuit 28 as required and, then, the amplified electric signal is converted into an amount of energy such as wattage by making a reference to a table preliminarily stored in a memory section, such as a ROM. The value of the signal indicative of the amount of energy resulted from the conversion is transmitted from the head portion to the controller portion 1A through the signal line. In the controller portion 1A, the A/D converter 31 performs A/D conversion on the electric signal and, then, the electric signal is inputted to the controller operation portion 30.

(Controller Operation Portion 30)

The controller operation portion 30 is capable of detecting the oscillation state, such as the ON/OFF, the laser power and the like of the laser light output, from the feedback from the output monitoring section 27. Further, the controller operation portion 30 controls the temperature control section 22 which controls the temperature of the wavelength conversion device 20. The temperature adjustment section 21 is controlled by the temperature control section 22, such that the temperature of the wavelength conversion device 20 which is detected by the temperature measurement section 23 becomes a target temperature. The controller operation portion 30 instructs the temperature adjustment section 21 on a target temperature for the wavelength conversion device 20 and, also, receives the current temperature of the wavelength conversion device 20 from the temperature adjustment section 21.

The controller operation portion 30 realizes the function of a temperature holding section which holds the maximum laser power value detected by the output monitoring section 27 and the temperature of the wavelength conversion device 20 detected by the temperature measurement section 23 at the time when the laser power was maximized, as a result of temperature searching for varying the temperature of the wavelength conversion device 20 and measuring the laser power at each temperature Further, the controller operation portion 30 realizes the function of a temperature setting section which makes an optimum temperature setting for setting the temperature of the wavelength conversion device 20 which maximizes the laser power which is held by the temperature holding section, as an optimum temperature for the wavelength conversion device 20. Further, the controller operation portion 30 realizes the function of a searching-range setting section which sets a start temperature with which the temperature adjustment section 21 starts changing the temperature of the wavelength conversion device 20 for performing temperature searching, based on the initially-set ambient temperature stored in an initial-set-temperature storage section, and also makes a setting as to whether the temperature searching should be performed toward a higher temperature or a lower temperature than the start temperature based on the ambient temperature acquired by the ambient-temperature acquisition section. Further, the controller operation portion 30 realizes the function of a temperature search determination section which determines that temperature searching should be performed, if the temperature difference between the initially-set ambient temperature stored in the initial-set-temperature storage section and the ambient temperature acquired by the ambient-temperature acquisition section exceeds a preset reference value. The controller operation portion 30 as described above is constituted by a CPU and the like.

Further, the controller operation portion 30 includes a memory portion 5. The memory portion 5 functions as a temperature storage section for storing the optimum temperature set by the temperature setting section, and the initial-set-temperature storage section for storing the initially-set ambient temperature. Further, there is no need for recording the temperature of the wavelength conversion device 20 at all measurement points. The temperature setting section is required only to store at least the maximum value of the laser power. For example, when the temperature of the wavelength conversion device 20 is swept, instead of recording all the laser powers at respective temperatures, at least the maximum laser power value, out of the laser power values obtained until the present time, can be held, a comparison can be made between the next measured laser power and the maximum value and, if the laser power at this time is larger, this laser power can be overwritten. As a matter of course, all the data can be stored, and thereafter, a maximum laser power value out of them can be determined, and this temperature can be set as an optimum temperature.

(Control of Temperature of Wavelength Conversion Device 20)

The laser processing apparatus searches for an optimum temperature of the wavelength conversion device 20, namely the temperature at which the laser light output is maximized, with the output monitoring section 27 for monitoring the laser power. The wavelength conversion device 20 is controlled in temperature by the temperature adjustment section 21. The temperature is swept within a predetermined range from a lower temperature to a higher temperature or from a higher temperature to a lower temperature, and the laser power from the wavelength conversion device 20 is monitored by the output monitoring section 27 at each temperature. When the sweeping over the predetermined range has been completed, the temperature at which the maximum laser power value was recorded is stored in the memory portion 5, as an optimum temperature of the wavelength conversion device 20. Hereinafter, there will be described a method with which the temperature control section 22 searches for a temperature of the wavelength conversion device 20.

(Function of Searching for Temperature for Wavelength Conversion Device 20)

The wavelength conversion device 20 outputs SHG which varies with the temperature. In general, there is an optimum value of the temperature of the wavelength conversion device 20, the SHG output is peaked at a certain temperature, and the output tends to decrease as the temperature of the wavelength conversion device 20 is deviated from the optimum value. Particularly, the LBO is sensitive to the temperature, and it is important to adjust the temperature of the LBO to the optimum temperature. The optimum temperature is determined by the angle of incidence of the fundamental wave to the LBO crystal, but it is hard to uniquely determine the positional relationship therebetween based on the structure. Accordingly, in the present embodiment, the LBO is provided with the temperature adjustment section 21, which enables adjusting the temperature thereof to the optimum temperature. On the other hand, it is desirable to uniquely set the optimum temperature of the LBO at the time of the shipment of the laser processing apparatus, but the temperature of the LBO is slightly changed with the change of the temperature of the environment where it is used, in actual. This is possibly caused by insufficient thermal insulation around the LBO crystal, the temperature characteristics of the circuit portions of the temperature measurement section 23, and the like, and it is not easy to improve them. Accordingly, in the present embodiment, an optimum temperature of the LBO is preliminarily searched for by utilizing the output monitoring section 27, before the usage of the laser processing apparatus and the like, and the temperature control is re-adjusted based on the acquired optimum temperature.

Figure 3:
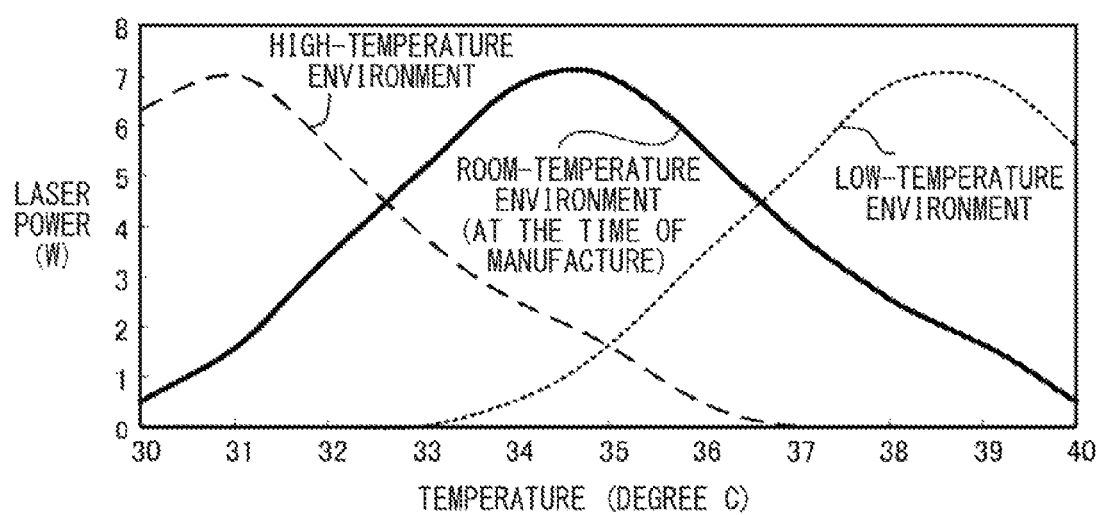
FIG. 3 is a graph illustrating temperature characteristics of an LBO.

This state will be described with reference to a graph of FIG. 3 illustrating temperature characteristics of the LBO as the wavelength conversion device 20. This figure is based on numerical values obtained from a temperature meter for the LBO and illustrates a state where the temperature characteristic of the LBO appears to change with the ambient temperature, due to the influence of the ambient temperature on the measurement accuracy of the temperature meter. A solid line represents a waveform indicating a temperature characteristic of the LBO in a room-temperature environment (at the time of manufacture of the laser processing apparatus), a broken line indicates a temperature characteristic when the ambient temperature is high, and a dotted line indicates a temperature characteristic when the ambient temperature is low. As described above, the measurement value obtained from the temperature meter is not always accurate and is affected by the ambient temperature in the environment of measurement. Accordingly, even when the temperature characteristics have been properly set in a room-temperature environment at the time of manufacture, the wavelength conversion device 20 can not operate as desired. For example, when the ambient temperature is high, the actual temperature of the LBO is higher than the temperature indicated by the temperature meter. Accordingly, as can be seen by the broken line in FIG. 3, it is possible to realize control based on an optimum temperature, by controlling the temperature of the LBO to a lower temperature than a room temperature. Further, on the contrary, when the ambient temperature is low, the actual temperature of the LBO is lower than the temperature indicated by the temperature meter. Accordingly, it is possible to perform proper control, by controlling the temperature of the LBO to a higher temperature than a room temperature.

As described above, it is important to determine a value indicated by the temperature meter which indicates an optimum temperature suitable for the operations of the LBO, according to the temperature in the environment where it is used. Accordingly, the laser processing apparatus has the temperature searching function for searching for an optimum temperature. In this case, before processing, the temperature searching function is executed for searching for an optimum temperature and, thereafter, the value of the optimum temperature is recorded, and the temperature adjustment section 21 constituted by a Peltier device or the like is controlled such that the temperature of the LBO becomes the recorded optimum temperature during processing. More specifically, so-called hill-climbing search is performed for searching for the position of a temperature at which the laser power is maximized.

(Flow Chart)

Figure 4:
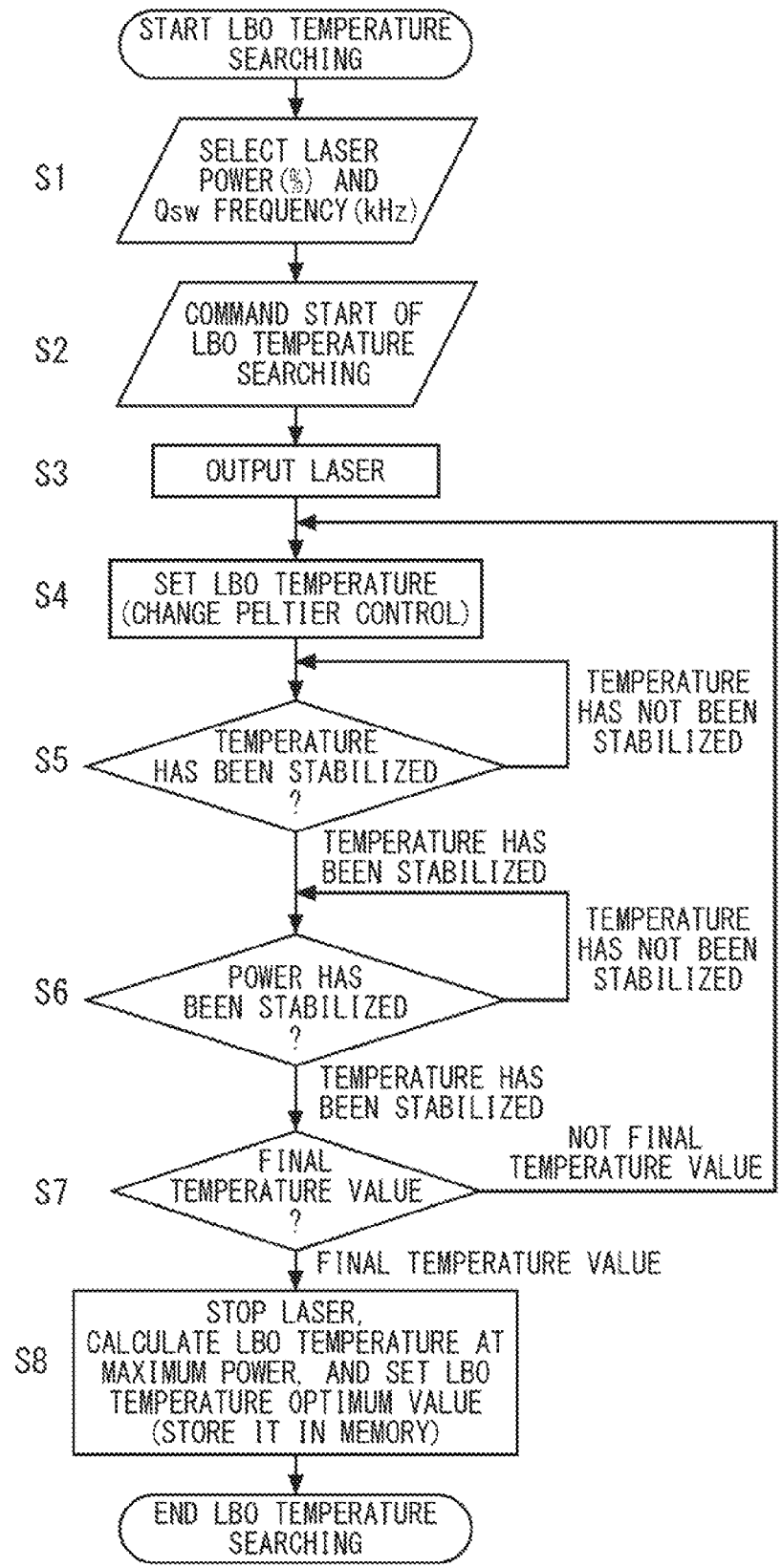
FIG. 4 is a flow chart illustrating a procedure for executing the temperature searching function.

Next, there will be described, in detail, a procedure for executing the temperature searching function, with reference to a flow chart of FIG. 4. At first, in step S1, a laser power and a Q-switch frequency are selected, as preparation processing. In this case, a user specifies a laser power with a unit of % and also specifies a Q-switch frequency with a unit of kHz, through a laser-power checkup setting field 422 in a user interface screen page 420 (which will be described in detail, later) of a laser-processing setting program illustrated in FIG. 8. Next, in step S2, a command for start of LBO temperature searching is generated. In this case, the user pushes an auto-calibration start button in a screen page of FIG. 9 (which will be described in detail later) for specifying the timing of the start of temperature searching. Then, in step S3, laser outputting is started. Then, in step S4, a setting of the temperature of the LBO is made. At this time, the temperature control section 22 updates a command for a target temperature to the Peltier device which is the temperature adjustment section 21. In the first phase, a start temperature is specified. Next, in step S5, the temperature of the LBO is measured by the temperature measurement section 23, and it is determined whether or not the temperature thereof has been stabilized. If the temperature thereof has been stabilized, the procedure proceeds to subsequent step S6. If the temperature has not been stabilized, step S5 is repeated as a loop. In this case, as a condition for stabilization, if the result of temperature measurement has continuously fallen within a certain range a predetermined number of times, this results in a determination that the temperature has been stabilized. Next, in step S6, it is determined whether or not the laser power has been stabilized and, if it has been stabilized, the procedure proceeds to subsequent step S7. If it has not been stabilized, step S6 is repeated as a loop. In this case, similarly, the determination is performed, based on whether or not the result of measurement of the laser power by the output monitoring section 27 has continuously fallen within a certain range a predetermined number of times, as a condition for stabilization.

Further, in step S7, it is determined whether or not the temperature set for the temperature adjustment section 21 is a final value and, if it is the final value, the procedure proceeds to subsequent step S8, but, if it is not the final value, the procedure returns to step S4 where the setting of the temperature for the temperature adjustment section 21 is updated to a next target temperature. In this way, the operations in steps S4 to S7 are repeated and, if the final temperature has been reached, the procedure proceeds to step S8 where the laser output is stopped, the temperature of the LBO which maximized the laser power is calculated, and this temperature is set as an optimum temperature of the LBO and is stored in the memory portion 5. As described above, the temperature searching is completed.

Figure 5:
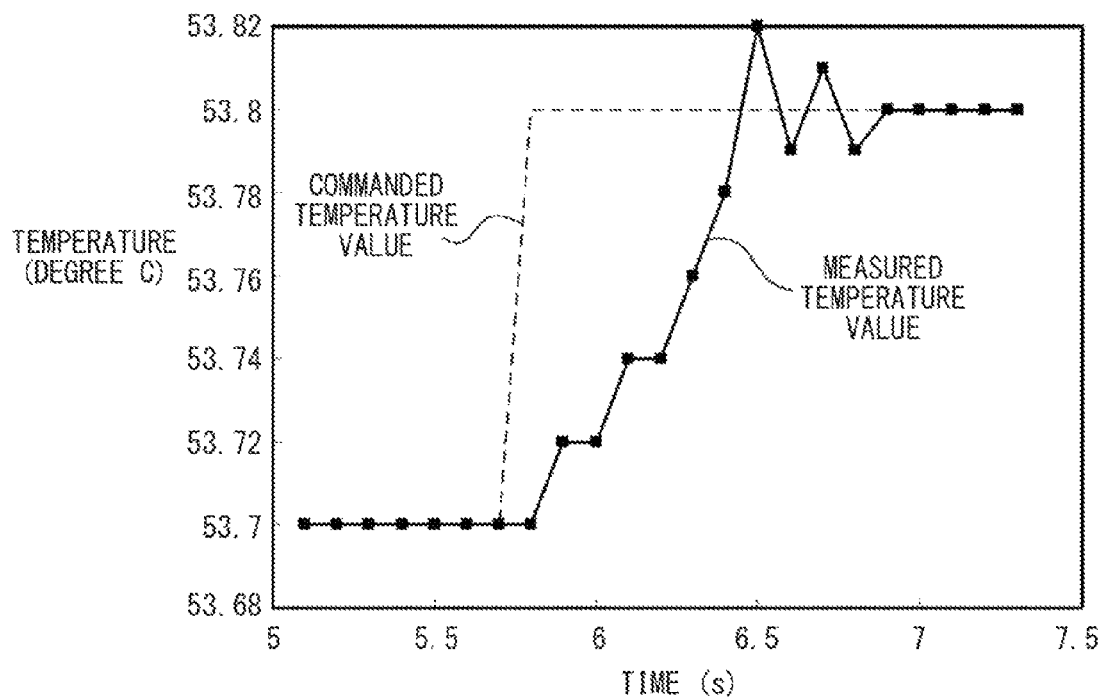
FIG. 5 is a graph illustrating a commanded temperature value and the change of the actual measured temperature value with respect thereto.

FIG. 5 illustrates a graph illustrating a target temperature and the change in the actual temperature control for the target temperature. As illustrated in the figure, in controlling the temperature, after heating by the temperature adjustment section 21, a time lag is induced until the LBO is actually heated or cooled to the target temperature and, also, an overshoot occurs in the measurement value. In this example, the temperature of the LBO is measured by the temperature measurement section 23 with a sampling interval of 100 ms, and the temperature control section 22 performs feedback control therewith. Further, as a condition for completion of the control, if the measurement value has fallen within the range of −0.02 to +0.02 degree C. with respect to the target temperature five times continuously, namely for 0.5 second or more, with respect to the specified value, it is determined that the temperature has been stabilized, and the control is ended.

Further, the timing of the temperature searching is preferably before printing processing. Also, when the laser power is calibrated, the temperature searching can be performed in addition thereto. Also, the temperature searching can be executed at arbitrary timing specified by the user. The timing of the execution of the temperature searching will be described, in detail, later.

(Algorism for Shortening Temperature Searching)

Next, there will be described an algorism for performing the temperature searching within a short time period. With the temperature searching, if the range of the temperature searching is set to be large, the number of repetitions of the loop from step S4 to step S7 is increased, thereby increasing the searching time period. If the searching time period is increased, this will extend the user's waiting time, thereby reducing the operation efficiency.

Figure 6:
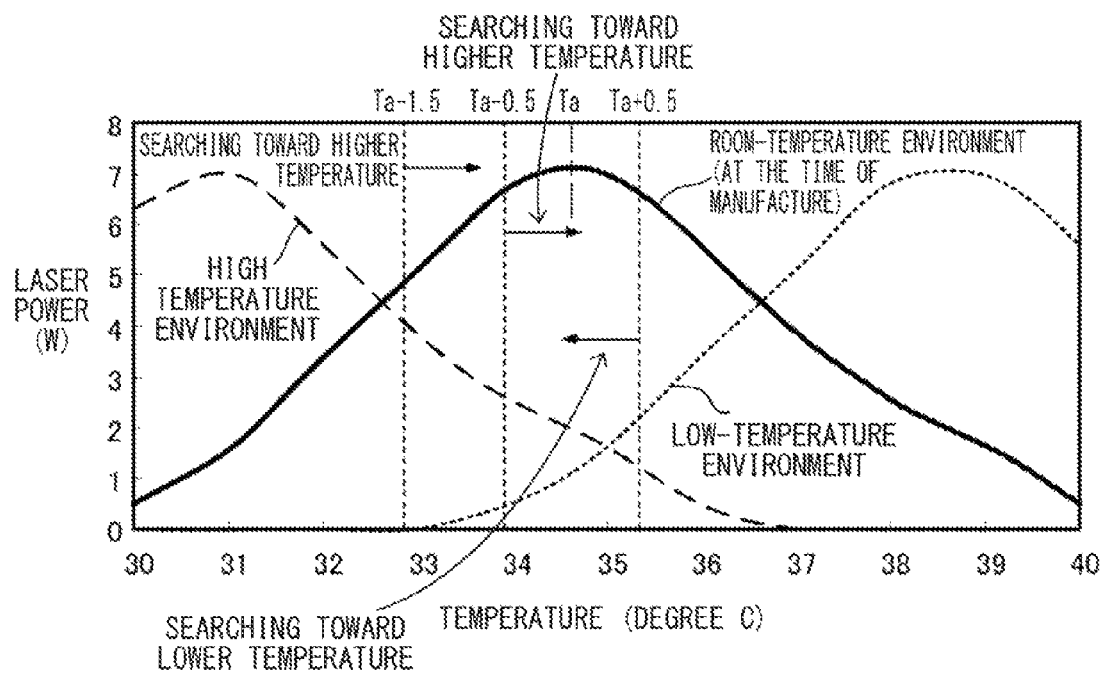
FIG. 6 is a graph illustrating the directions of the changes of measured temperature values depending on the ambient temperature, corresponding to the temperature characteristics of FIG. 3.

On the other hand, as illustrated in FIG. 6, the direction of the change of the optimum temperature is changed, depending on the ambient temperature. More specifically, when the ambient temperature is high, the optimum temperature is moved to a lower temperature than a room temperature. When the ambient temperature is low, the optimum temperature is moved to a higher temperature than the room temperature. Specifically, if the ambient temperature is known, it is possible to determine whether the temperature characteristic at a room temperature has been moved in the direction toward a higher temperature or in the direction toward a lower temperature and, therefore, it is necessary only that the searching is performed only in this direction, which can narrow the range of searching, thereby shortening the time period required for the temperature searching. The ambient temperature is measured by a temperature meter mounted on the head portion. In this case, the temperature measurement section 23 for measuring the temperature of the LBO can be employed instead thereof, which can reduce the number of components and the cost. However, it goes without saying that an ambient-temperature acquisition section for measuring the ambient temperature can be additionally provided.

(Amount of Offset)

Further, the temperature searching can be performed from an optimum temperature Ta at a room temperature, as an initial value, to a higher temperature or a lower temperature. However, in order to enable more accurate temperature searching, an amount of offset can be added to the initial value. For example, when searching is performed toward a higher temperature, the temperature is changed with a predetermined interval from a temperature lower than the optimum temperature Ta by a predetermined value, as an initial value, to a higher temperature. On the contrary, when searching is performed toward a lower temperature, the temperature is changed with a predetermined interval from a temperature higher than the optimum temperature Ta by a predetermined value, as an initial value, to a lower temperature. Accordingly, even when the optimum temperature Tt under the current condition exists near the optimum temperature Ta at a room temperature, it is possible to perform searching without missing the optimum temperature Tt.

Further, the amount of offset is not limited to a constant value and can be varied. For example, the amount of offset OF1 in cases of a lower temperature can be made different from the amount of offset OF2 in cases of a higher temperature. Particularly, when the current temperature is a temperature close to the temperature at the time of manufacturing during which the optimum temperature Ta was measured (a room temperature), there is a high possibility that the optimum temperature Tt under the current condition exists near the optimum temperature Ta at a room temperature and, therefore, it is preferable to make the amount of offset OF3 larger than in cases of a higher temperature or a lower temperature.

(Concrete Procedure for Shortening Temperature Searching)

Figure 7:
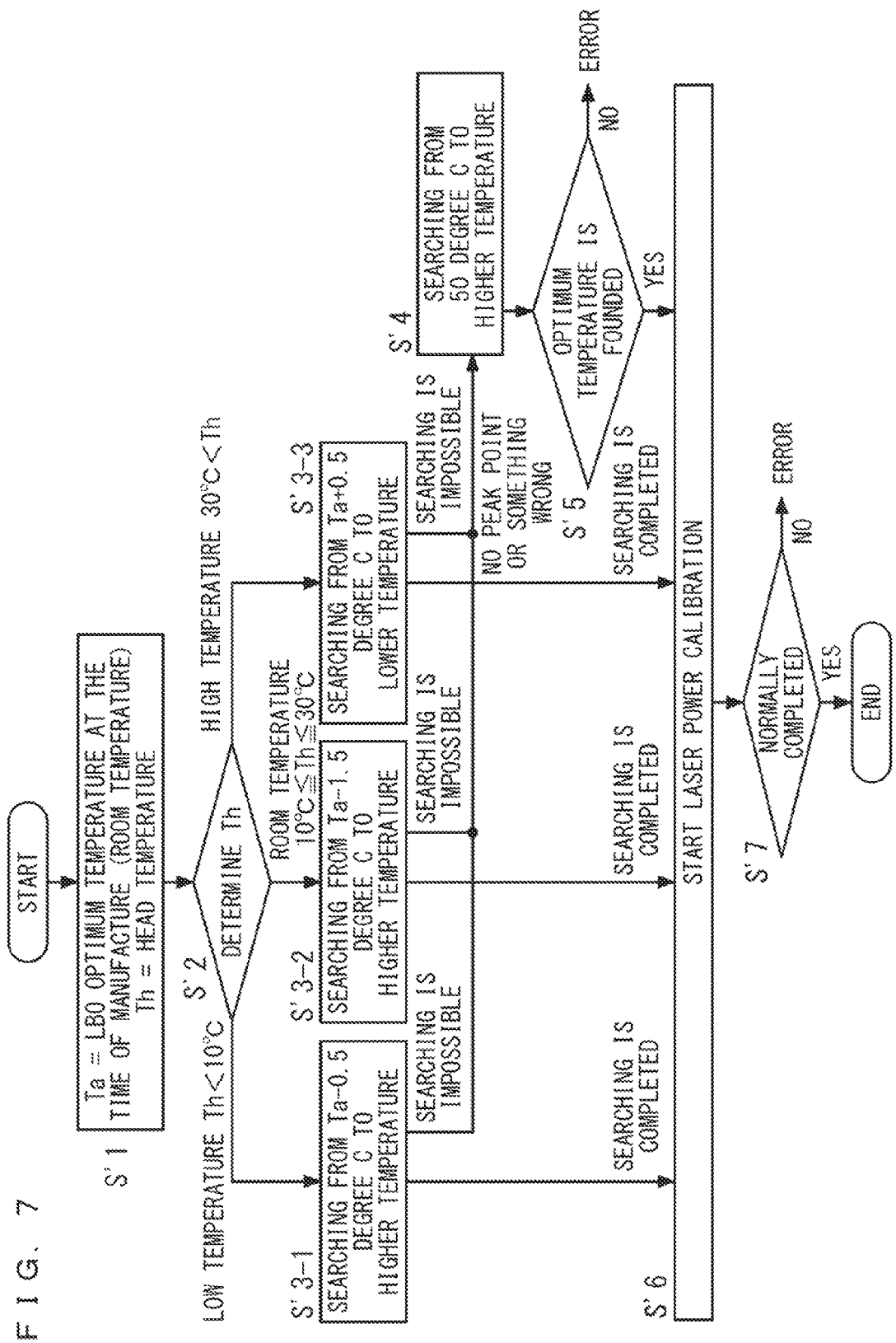
FIG. 7 is a flow chart illustrating a procedure for shortening temperature searching.

Hereinafter, there will be described a procedure for shortening the temperature searching, with reference to a flow chart of FIG. 7. At first, in step S'1, the searching conditions are initialized. More specifically, an optimum temperature of the LBO at the time of manufacturing of the laser processing apparatus (a room temperature) is set as Ta, and the current ambient temperature around the head portion (the temperature of the LBO) is set as Th. Next, in step S'2, it is determined whether the ambient temperature Th around the head portion is a lower temperature, a room temperature or a higher temperature. In this case, when the ambient temperature Th is lower than 10 degrees C., it is determined that the ambient temperature Th is a lower temperature and the procedure proceeds to step S'3-1. When the ambient temperature Th is equal to or higher than 10 degrees C. and also equal to or lower than 30 degrees C., it is determined that the ambient temperature Th is a room temperature and the procedure proceeds to step S'3-2. When the ambient temperature Th is higher than 30 degrees C., it is determined that the ambient temperature Th is a higher temperature and the procedure proceeds to step S'3-3. Then, in each step, the temperature searching is executed. In this case, the amount of offset is set to 0.5 degree C. in the case of a high temperature or a low temperature, and the amount of offset is set to 1.5 degrees C. in the case of a room temperature.

At first, in the case of a low temperature, in step S'3-1, the searching is performed from Ta-0.5 degree C. to a higher temperature. If an optimum temperature is founded, the procedure proceeds to step S'6 where calibration of the laser power is started. On the contrary, in the case of a high temperature, in step S'3-3, the searching is performed from Ta+0.5 degree C. to a lower temperature. If an optimum temperature is founded, similarly, the procedure proceeds to step S'6 where calibration of the laser power is started. Further, in the case of a room temperature, in step S'3-2, the searching is performed from Ta−1.5 degrees C. to a higher temperature. Similarly, if an optimum temperature is founded, the procedure proceeds to step S'6 where calibration of the laser power is started. On the other hand, in any of the cases of steps S'3-1 to S3'-3, if the searching is unsuccessfully completed, due to some reasons such as absence of a peak position of the laser power, the procedure proceeds to step S'4 where the range of the temperature searching is reset to be wider and, then, searching is performed again. That is, the searching is changed over to searching by sweeping a wider range as in the prior art. In this case, the searching is performed from 50 degrees C. to a higher temperature. As a result, if an optimum temperature is founded in step S'5, the procedure proceeds to step S'6. If no optimum temperature is founded, it is determined that there has been an error in the searching, and a predetermined error notification operation such as issue of an error output is performed.

In step S'6, the temperature of the LBO is controlled based on the determined optimum temperature, and calibration of the laser power is started. Further, if it is determined, in step S'7, that the calibration has been normally completed, the processing is ended. On the other hand, if it has not been normally completed, an error notification operation is performed. By using the algorism, it is possible to largely reduce the searching time period in comparison with conventional searching methods, which can reduce the waiting time, thereby reducing the burden on the user.

(Timing of Execution of Temperature Searching Function)

In the above-described example, the optimum temperature of the LBO is corrected at the same timing as the timing of the execution of calibration of the laser power. However, the timing of the execution of the temperature searching is not limited to this example. Particularly, when there is a large temperature difference between the LBO ambient temperature $T_L$ at the time of manufacturing and the current ambient temperature $T_E$, it is expected that the current temperature characteristic is different from the set temperature characteristic, and it is preferable to make a setting of the temperature characteristic again, before processing. Therefore, the absolute value $|T_{L-TE}|$ of the temperature difference between the LBO ambient temperature $T_L$ at the time of manufacturing and the current ambient temperature $T_E$ is determined by the temperature searching determination section and, if the difference is equal to or larger than a certain value, this will result in a determination that it is preferable to execute temperature searching, and temperature searching can be automatically executed or the user can be urged to execute temperature searching. For example, at the time when the laser processing apparatus is activated, the temperature searching determination section determines the ambient temperature (or the head temperature) and determines the temperature difference automatically. Further, if it is determined that resetting through temperature searching is necessary, temperature searching is started. Also, an alarm can be outputted for urging the user to execute temperature searching. Also, even during execution of processing operations, the ambient temperature can be determined at predetermined timing and the determination operation is automatically performed and, if it is determined that temperature searching is necessary, an alarm can be outputted for urging the user to execute temperature searching. Also, the user can execute temperature searching at desired timing, such as the timing when the environment of the installation of the laser processing apparatus has been changed. Also, similarly, temperature searching can be executed at user's discretion, in the event of vibrations or impacts during transferring of the laser processing apparatus, reduction of the power, and the like. Further, the criterial temperature difference for determining whether or not the temperature searching function should be executed is set to, for example, in the range of 10 to 20 degrees C.

As described above, if the position of the LBO crystal is deviated due to mechanical impacts and the like, the optimum temperature therefor will be changed. Therefore, it can be said that it is preferable that, in performing calibration of the laser power, temperature searching is automatically executed in addition thereto and, thereafter, power calibration is executed. Accordingly, a setting of an optimum temperature for the wavelength conversion device 20 and laser power calibration can be started by a common trigger, which enables the user to perform these processing concurrently.

(Laser Power Calibration)

Hereinafter, calibration of the laser power will be described. The laser processing apparatus has preliminarily stored, in a memory table in the memory portion 5, LD current values and laser powers obtained from these LD current values, at the time of shipment from the factory. This enables reading, from the memory table, an LD current value corresponding to desired laser power set by the user and, then, flowing an electric current with the read value through the LD for obtaining the desired laser power set by the user. However, as the LD is degraded with the elapsed time, the laser power becomes smaller than the desired value, which necessitates corrections of the LD current values stored in the memory table. As a method for such calibration, it is possible to employ initial-value calibration, auto calibration, manual calibration and the like.

(Laser-Processing Setting Program)

Figure 8:
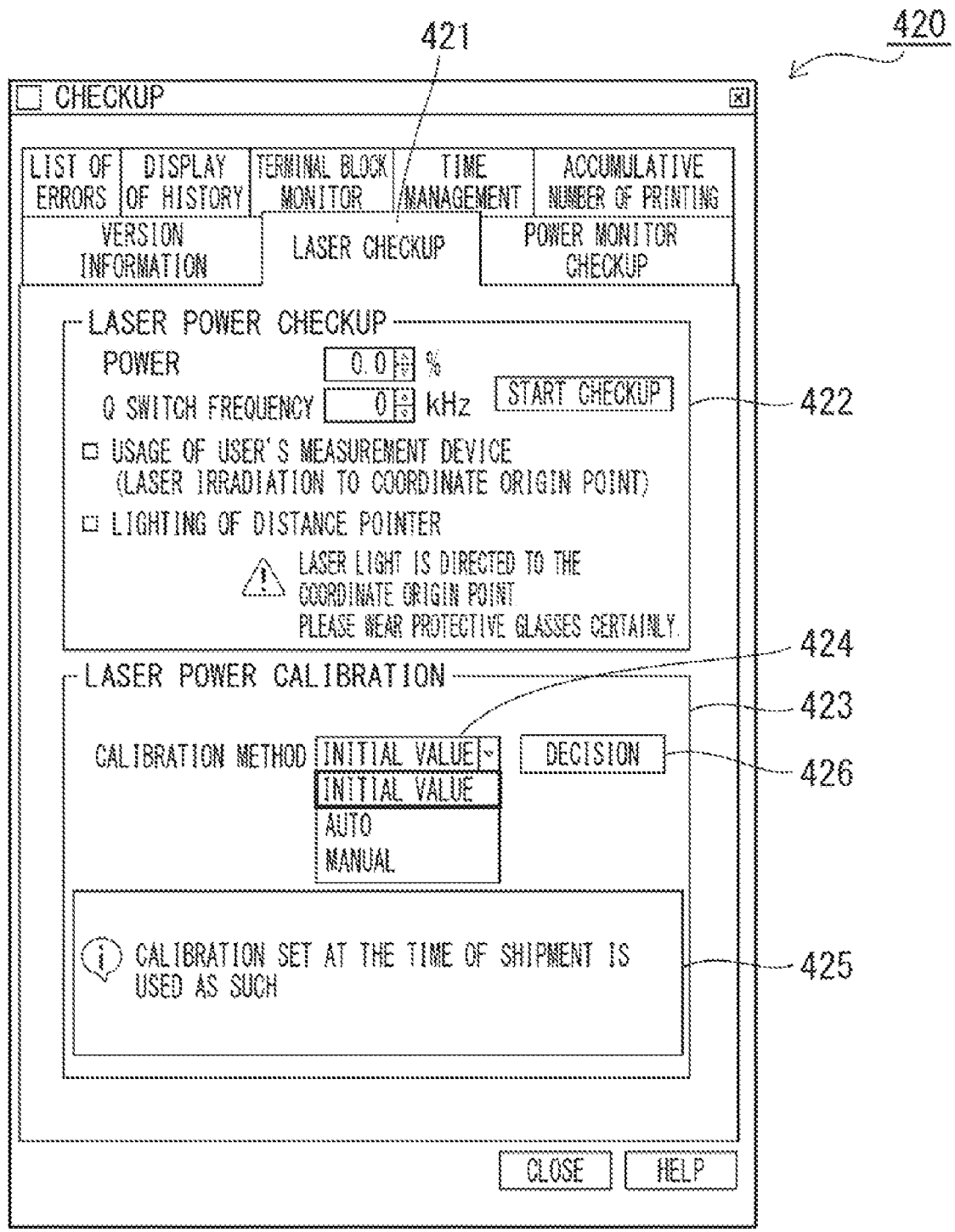
FIG. 8 is an image view illustrating a user interface screen page of a laser-processing setting program.

FIG. 8 illustrates an example of a user interface screen page 420 of the laser-processing setting program. In the screen page, there is provided a laser checkup tab 421 which is provided with a laser-power checkup setting field 422 and a laser-power calibration setting field 423. In the laser-power calibration setting field 423, there are provided a calibration-method selection field 424 and an explanation display field 425. The calibration-method selection field 424 enables specifying a calibration method. In this case, the user can select any of "Initial Value", "Auto" and "Manual", from a pull-down menu.

(Initial-Value Calibration)

If "Initial Value" is selected from the calibration-method selection field 424 in the screen page of FIG. 8, initial-value calibration is selected and, also, the explanation display field 425 is caused to display the explanation "the calibration set at the time of shipment is used as such". That is, as the initial-value calibration, an LD current value corresponding to the laser power set by the user is calculate, and the calculated LD current value is set, based on the memory table set at the time of shipment from the factory. At this time, no temperature searching is performed for the wavelength conversion device 20. If a "Decision" button 426 is pushed in this screen page, the initial-value calibration is executed to make a reference to the settings made at the time of shipment from the factory.

(Auto Calibration)

Figure 9:
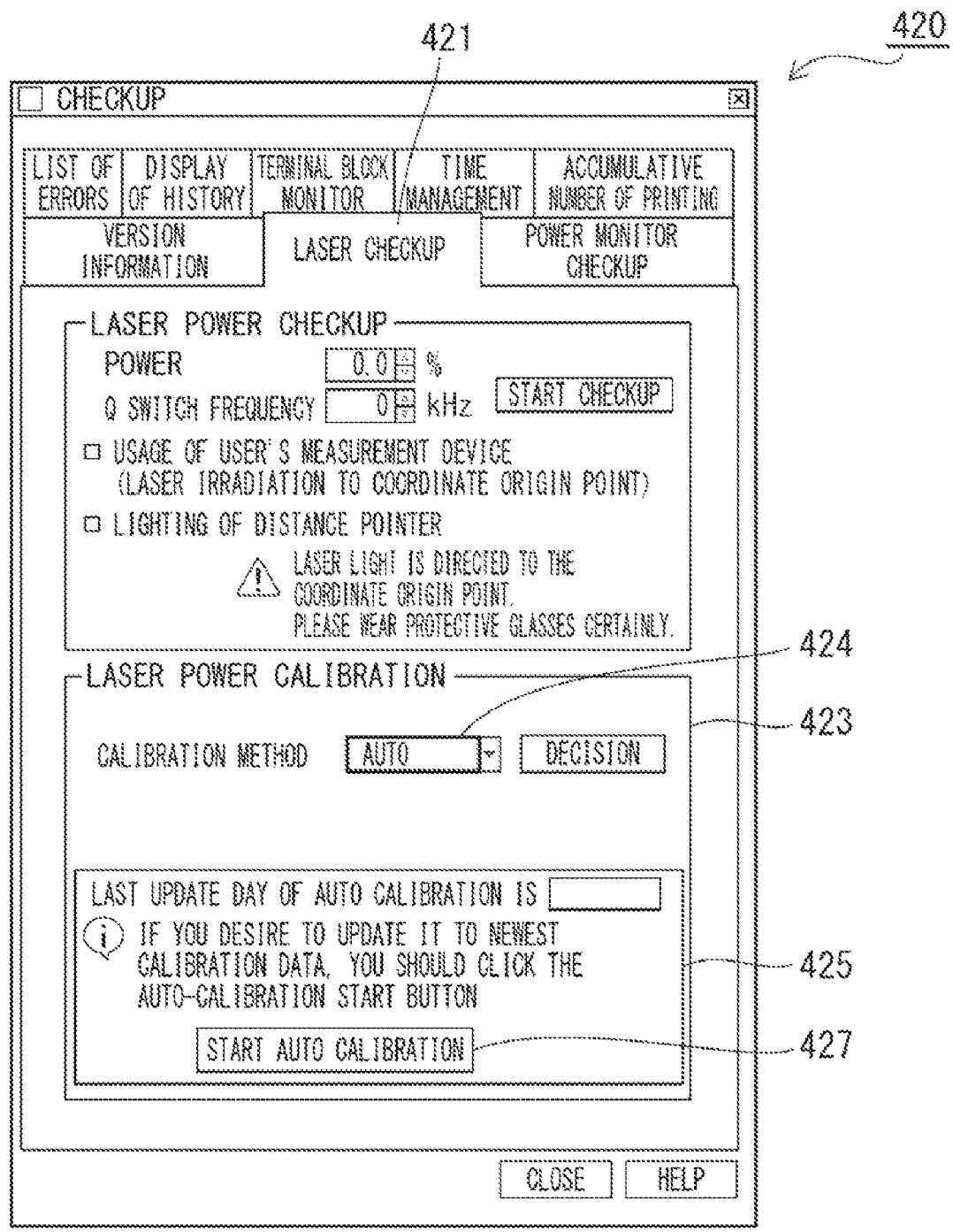
FIG. 9 illustrates a state where "Auto" has been selected in the screen page of FIG. 8.
Figure 10:
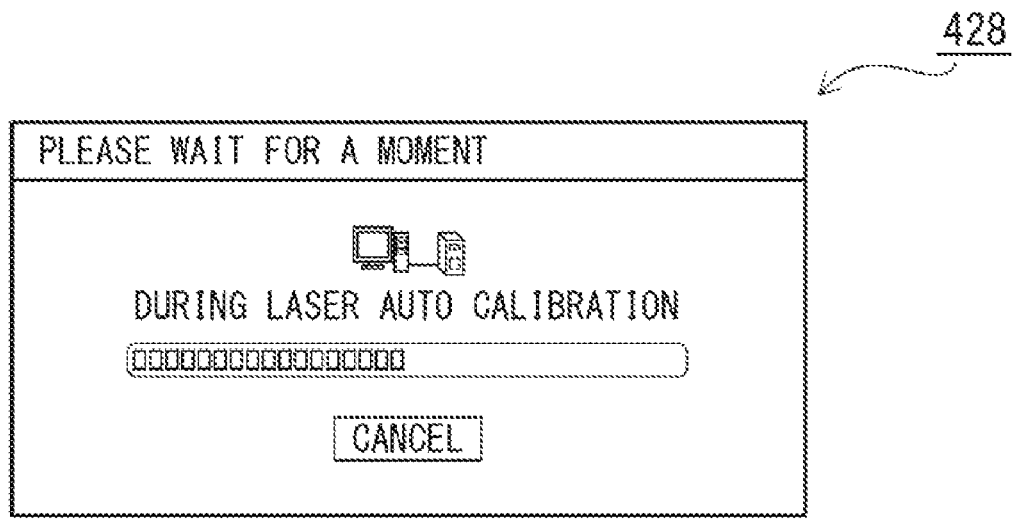
FIG. 10 is an image view illustrating a state where auto-calibration is being executed.

The auto calibration is a mode in which both calibration of the temperature of the wavelength conversion device 20 and laser power calibration are automatically performed. If "Auto" is selected from the calibration-method selection field 424 in the screen page 420 in FIG. 8, the auto calibration is selected as illustrated in FIG. 9 and, also, the explanation display field 425 is caused to display the explanation "the last update date of the auto calibration is *. If you desire to update it to newest calibration data, you should click the auto-calibration start button". If the auto-calibration start button 427 is pushed in the screen page, an auto-calibration execution screen page 428 illustrated in FIG. 10 is displayed, and auto calibration, namely temperature calibration and laser power calibration in this case, are executed successively. As described above, as the auto calibration, the temperature searching for the wavelength conversion device 20 is executed, at first. Further, if an optimum temperature which maximized the laser power is determined as a result of the temperature searching, the temperature of the wavelength conversion device 20 is controlled to the optimum temperature with the temperature adjustment section 21 and, also, the auto calibration of the laser power is started. In the auto calibration, the LD current value is discretely changed, and the laser powers at respective LD current values are recorded, for storing the current relationship between LD current values and laser powers. In this case, the relationship between LD current values and laser powers is stored in another memory table in the memory portion 5**, instead of overwriting it over the memory table created at the time of shipment from the factory. This enables calculating and setting an accurate LD current value which provides the laser power set by the user.

(Manual Calibration)

Figure 11:
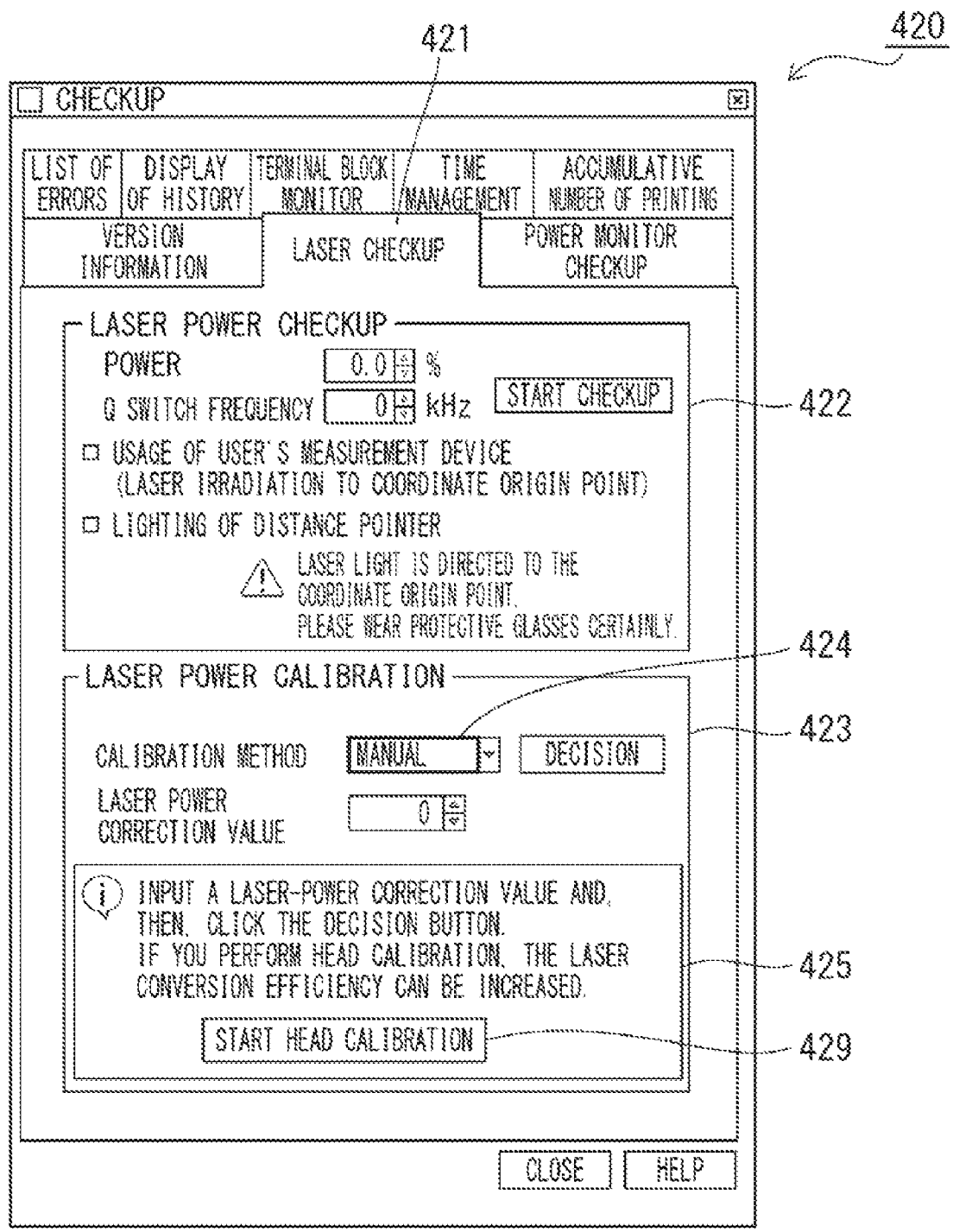
FIG. 11 illustrates a state where "Manual" has been selected in the screen page of FIG. 8.

The manual calibration is a mode which enables manually setting the amount of correction of the LD current value. If "Manual" is selected from the calibration-method selection field 424 in the screen page in FIG. 8, the manual calibration is selected as illustrated in FIG. 11 and, also, the explanation display field 425 is caused to display explanation "Input a laser-power correction value and, then, click the decision button. If you perform head calibration, the laser conversion efficiency can be increased." If a correction value for the LD current value is inputted to the screen page, and a head-calibration start button 429 is pushed, a head-calibration execution screen page 430 illustrated in FIG. 12 is displayed, and head calibration is executed. In this case, after searching for an optimum temperature for the wavelength conversion device 20, the LD current value is corrected, based on the set correction value. The actual laser power output can be checked up by pushing a checkup starting button in the laser-power checkup setting field 422.

As described above, temperature searching is performed for the wavelength conversion device 20 and the temperature of the wavelength conversion device 20 is controlled to an optimum temperature, before the laser power calibration is started. Accordingly, the laser power calibration can be performed with high accuracy without being influenced by the environment of user's usage.

(THG, FHG and the Like)

Figure 14:
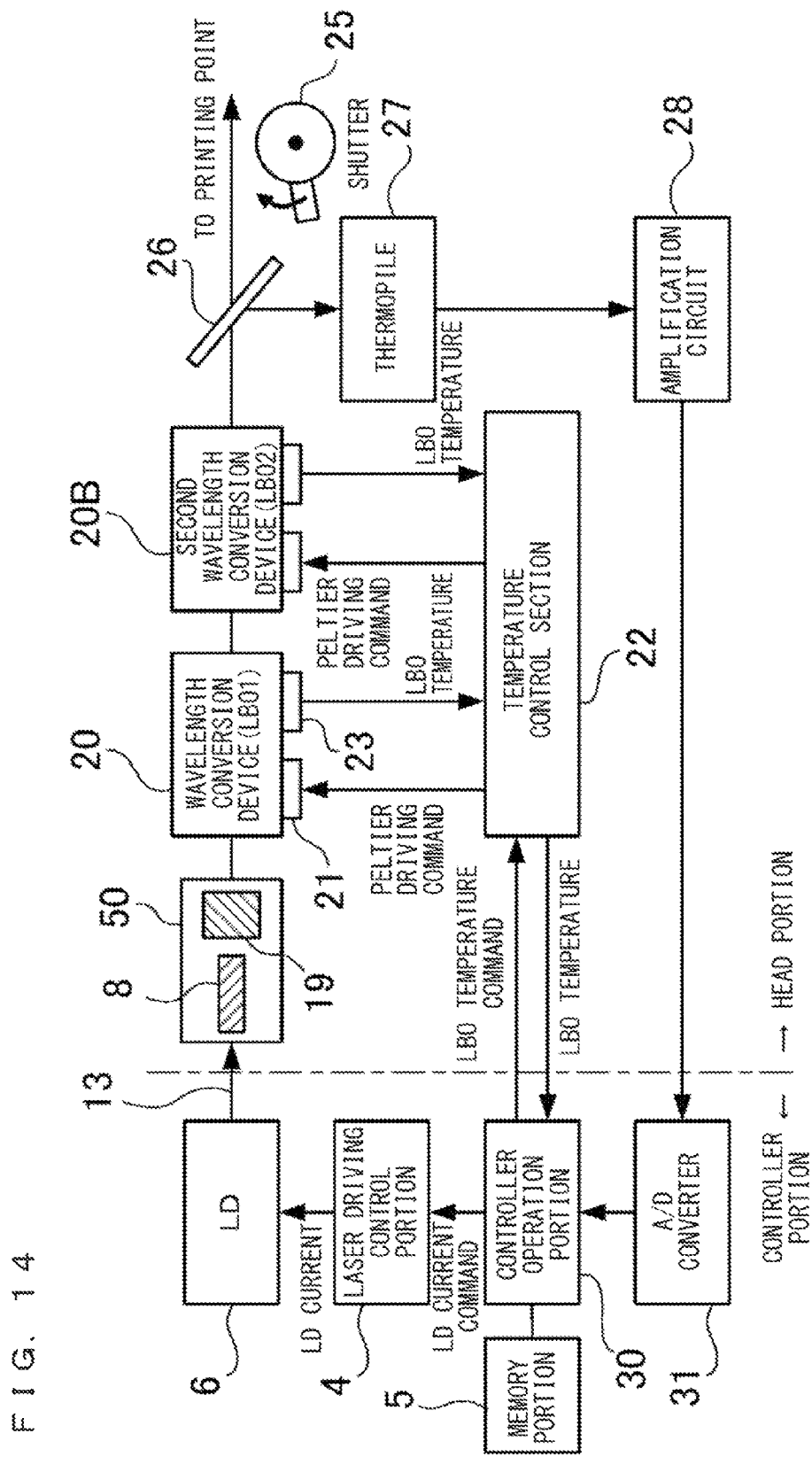
FIG. 14 is a block diagram illustrating a third-harmonic-wave laser processing apparatus corresponding to FIG. 13.
Figure 15:
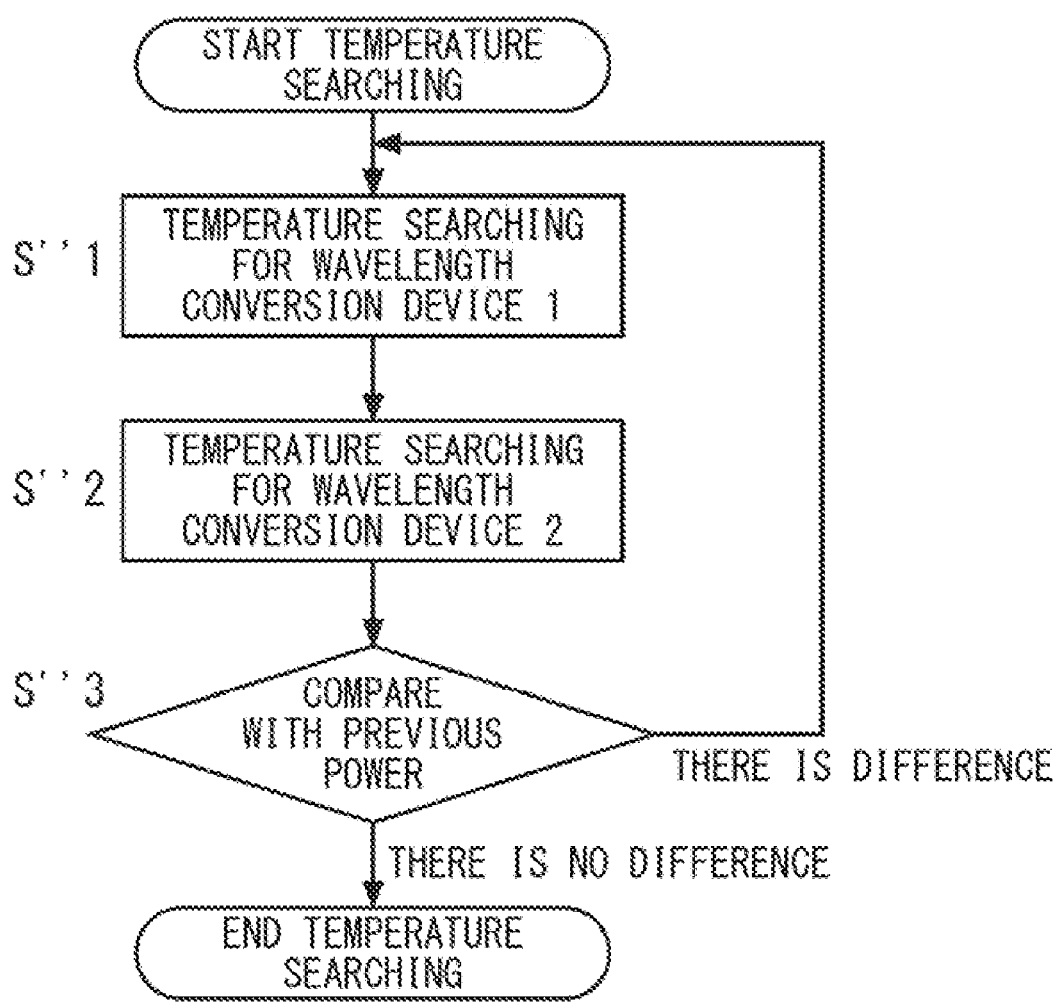
FIG. 15 is a flow chart illustrating a procedure for executing the temperature searching function for two wavelength conversion devices.
Figure 16:
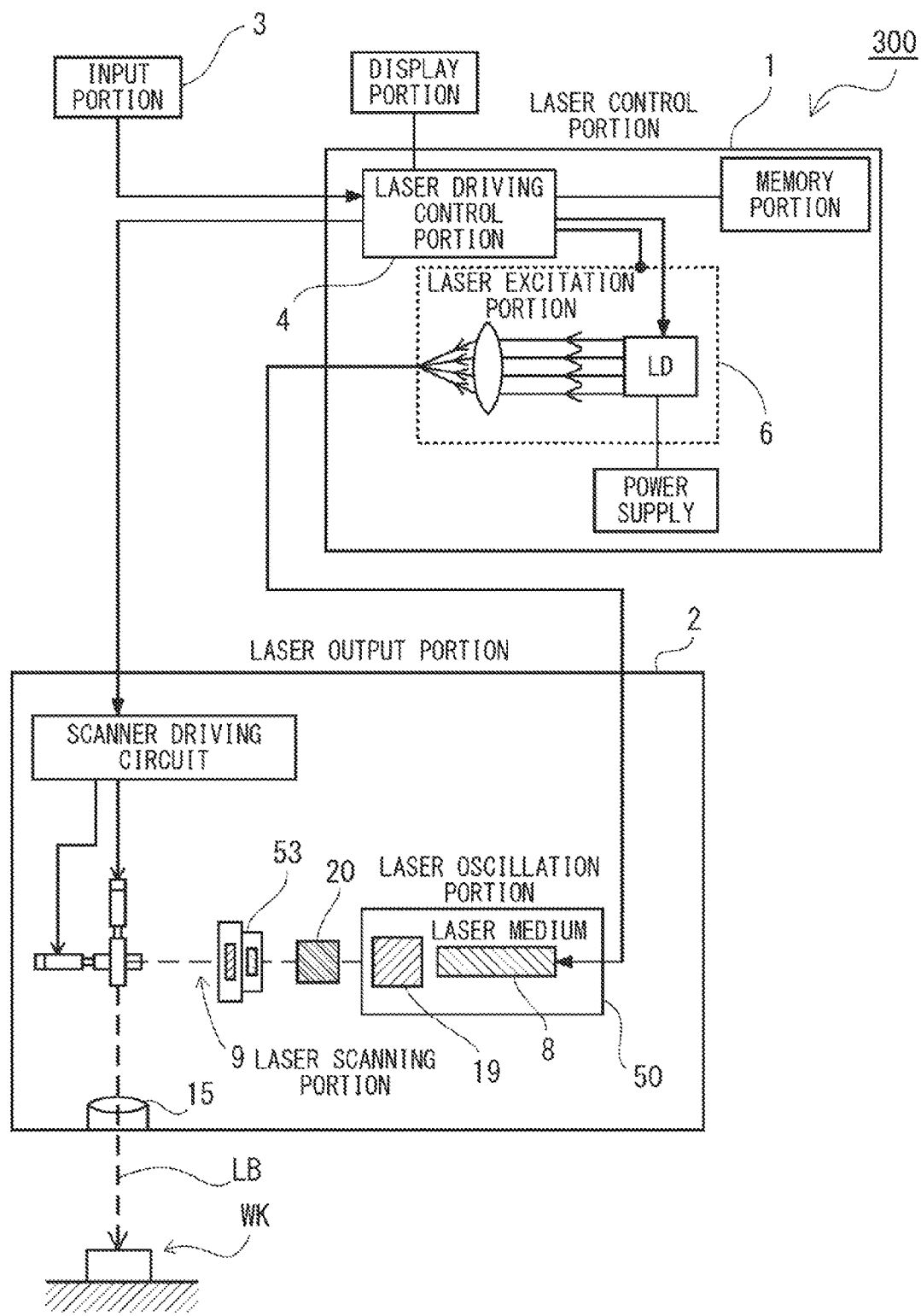
FIG. 16 is a block diagram illustrating the structure of a conventional laser processing apparatus.

In the above-described example, there has been described a laser processing apparatus capable of outputting a second harmonic wave using an LBO crystal. In the present embodiment, the wavelength conversion for laser light can be also applied to a laser processing apparatus utilizing a third or fourth harmonic wave or the like, as well as a second harmonic wave. In order to utilize such higher harmonic waves, the plurality of wavelength conversion devices are used. FIG. 13 illustrates exemplary placements for generating different higher harmonic waves utilizing the plurality of wavelength conversion devices, wherein FIG. 13 illustrates a second harmonic generation (SHG) using the LBO crystal illustrated in FIG. 1, third harmonic generation (THG), fourth harmonic generation (FHG), fifth harmonic generation (FIHG), sum frequency generation (SFG), optical parametric oscillation (OPO), and differential frequency generation (DFG), respectively. In the case of using plurality of wavelength conversion devices as described above, temperature searching is executed for the individual respective conversion devices. Accordingly, the temperature adjustment section 21 and the temperature measurement section 23 are provided for each of the wavelength conversion devices. FIG. 14 illustrates a block diagram of a third-harmonic-wave laser processing apparatus using an LBO as a second wavelength conversion device 20B by way of example (corresponding to FIG. 13(b)). In the case of using two LBO crystals, basically, it is possible to employ the same adjustment method for cases of using a single crystal. However, there is the possibility that the temperature of one of the devices affects the temperature of the other device and, therefore, it is necessary to perform temperature searching for both of the devices. In this case, if temperature searching is performed for both of the devices, this will require a long time period. Therefore, at a state where the temperature of an LBO 2 which is a wavelength conversion device 20B out of them is fixed, temperature searching for an LBO1 which is the other wavelength conversion device 20 is performed. After an optimum temperature for LBO1 has been founded at this state, it is preferable to perform temperature searching for the temperature of the LBO 2 around this temperature. FIG. 15 illustrates a flow chart illustrating an exemplary procedure for performing temperature searching for two wavelength conversion devices. As illustrated in the figure, temperature searching for a wavelength conversion device (LBO1) is performed in step S"1 and, then, temperature searching for the second wavelength conversion device (LBO2) is performed in step S"2, thereafter, in step S"4, the laser power resulted from the temperature searching is compared with the laser power obtained from the previous temperature searching or the laser power obtained at the time of shipment from the factory, if the difference therebetween falls within a predetermined range, the temperature searching is ended, but if the difference therebetween exceeds the predetermined range, the procedure is returned to step S"1 where temperature searching is performed again. In this way, an optimum temperature can be properly set for the plurality of wavelength conversion devices.

The laser processing apparatus, the method for making settings for the laser processing apparatus, the program for making settings for the laser processing apparatus, and the computer-readable recording medium according to the present invention can be widely applied for making settings of stereoscopic shapes in processing for applying laser to stereoscopic surfaces having stereoscopic shapes, such as marking, drilling, trimming, scribing, surface processing. Further, while there has been exemplified a laser marker capable of three-dimensional printing, the present invention can be preferably applied to laser markers capable of two-dimensional printing.

What is claimed is:

1. A laser processing apparatus for directing laser light to a to-be-processed surface for performing desired processing thereon, the laser processing apparatus comprising:
   a laser medium for creating fundamental-wave laser light with a fundamental frequency;
   a wavelength conversion device which, if the fundamental-wave laser light from the laser medium is inputted thereto, creates higher-harmonic-wave laser light with a harmonic wavelength of a higher order than the wavelength of the fundamental-wave laser light;
   a temperature measurement section for measuring the temperature of the wavelength conversion device;
   a temperature adjustment section for adjusting the temperature of the wavelength conversion device;
   a temperature control section for controlling the temperature adjustment section for changing the temperature of the wavelength conversion device within a predetermined range;
   an output monitoring section for measuring the laser power emitted from the wavelength conversion device at each temperature of the wavelength conversion device which is changed in temperature by the temperature control section; and
   a temperature setting section for setting the temperature of the wavelength conversion device at which the laser power measured by the output monitoring section has a maximum value, as an optimum temperature of the wavelength conversion device.

2. The laser processing apparatus according to claim 1, further comprising
   an initial-set-temperature storage section for storing an initially-set ambient temperature around the wavelength conversion device,
   an ambient-temperature acquisition section for acquiring the ambient temperature around the wavelength conversion device, and
   a searching-range setting section for setting a start temperature with which the temperature adjustment section starts changing the temperature of the wavelength conversion device for performing temperature searching, based on the initially-set ambient temperature stored in the initial-set-temperature storage section, and also for setting whether the temperature searching should be executed toward a higher temperature or a lower temperature than the start temperature, based on the ambient temperature acquired by the ambient-temperature acquisition section.

3. The laser processing apparatus according to claim 2, wherein the searching-range setting section executes temperature searching from the start temperature toward a higher temperature if the ambient temperature acquired by the ambient-temperature acquisition section is lower than a predetermined temperature and executes temperature searching from the start temperature toward a lower temperature if the ambient temperature acquired by the ambient-temperature acquisition section is higher than the predetermined temperature.

4. The laser processing apparatus according to claim 3, wherein the start temperature for the temperature searching is set to the initially-set ambient temperature stored in the initial-set-temperature storage section plus a pre-set amount of offset.

5. The laser processing apparatus according to claim 4, further comprising a temperature searching determination section which determines that temperature searching should be executed, if the temperature difference between the initially-set ambient temperature stored in the initial-set-temperature storage section and the ambient temperature acquired by the ambient-temperature acquisition section exceeds a preset reference value.

6. The laser processing apparatus according to claim 5, wherein the temperature measurement section is also used as the ambient-temperature acquisition section.

7. The laser processing apparatus according to claim 6, wherein the temperature adjustment section changes the temperature with a predetermined sampling interval and, if the amount of change of the temperature has fallen within a predetermined range after the elapse of a predetermined time, a temperature holding section determines that the temperature has been stabilized and holds an optimum temperature and the laser power at this time.

8. The laser processing apparatus according to claim 6, wherein, if substantially the same laser power has been continuously obtained a predetermined number of times, as the output from the output monitoring section, the average of the continuously-obtained temperatures is held as an optimum temperature.

9. The laser processing apparatus according to claim 8, further comprising
a second wavelength conversion device which is placed on the optical axis of the light emitted from the wavelength conversion device and is capable of conversion of the wavelength of this emitted light, and
a second temperature control section capable of controlling the temperature of the second wavelength conversion device independently of the wavelength conversion device.

10. The laser processing apparatus according to claim 9, wherein a setting of an optimum temperature is made at the time of activation of the laser processing apparatus.

11. The laser processing apparatus according to claim 10, wherein a setting of an optimum temperature is made at the time of execution of calibration of the laser processing apparatus.

12. A method for making settings for a laser processing apparatus, the laser processing apparatus being adapted to input fundamental-wave laser light to a wavelength conversion device for directing, to a to-be-processed surface, higher-harmonic-wave laser light with a harmonic wavelength of a higher order than the wavelength of the fundamental-wave laser light for performing desired processing thereon, the method comprising the steps of:
controlling a temperature adjustment section for adjusting the temperature of the wavelength conversion device for changing the temperature of the wavelength conversion device within a predetermined range and executing temperature searching for measuring the power of the laser light emitted from the wavelength conversion device at each temperature; and
setting the maximum laser power value and the temperature of the wavelength conversion device at the time when the laser power had a maximum value as a result of the temperature searching, as an optimum temperature of the wavelength conversion device.

13. A program for making settings for a laser processing apparatus, the laser processing apparatus being adapted to input fundamental-wave laser light to a wavelength conversion device for directing, to a to-be-processed surface, higher-harmonic-wave laser light with a harmonic wavelength of a higher order than the wavelength of the fundamental-wave laser light for performing desired processing thereon, the program causing a computer to realize the functions of:
controlling a temperature adjustment section for adjusting the temperature of the wavelength conversion device for changing the temperature of the wavelength conversion device within a predetermined range and executing temperature searching for measuring the power of the laser light emitted from the wavelength conversion device at each temperature, and
setting the maximum laser power value and the temperature of the wavelength conversion device at the time when the laser power had a maximum value as a result of the temperature searching, as an optimum temperature of the wavelength conversion device.

14. A computer-readable recording medium which stores the program according to claim 13.

* * * * *